(12) United States Patent
Moll et al.

(10) Patent No.: US 12,327,302 B2
(45) Date of Patent: Jun. 10, 2025

(54) HAND-TRACKED TEXT SELECTION AND MODIFICATION

(71) Applicant: Snap Inc., Santa Monica, CA (US)

(72) Inventors: Sharon Moll, Lachen (CH); Dawei Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/664,010

(22) Filed: May 18, 2022

(65) Prior Publication Data

US 2023/0377223 A1 Nov. 23, 2023

(51) Int. Cl.
*G06T 11/60* (2006.01)
*G02B 27/01* (2006.01)
(Continued)

(52) U.S. Cl.
CPC .......... *G06T 11/60* (2013.01); *G02B 27/0101* (2013.01); *G02B 27/017* (2013.01); *G06F 3/011* (2013.01); *G06F 3/017* (2013.01); *G06T 19/006* (2013.01); *G06V 20/20* (2022.01); *G06V 40/10* (2022.01); *G06V 40/28* (2022.01); *G02B 2027/0138* (2013.01); *G02B 2027/014* (2013.01); *G02B 2027/0178* (2013.01)

(58) Field of Classification Search
CPC ... G06T 11/60; G06T 19/006; G02B 27/0101; G02B 27/017; G02B 2027/0138; G02B 2027/014; G02B 2027/0178; G06F 3/011; G06F 3/017; G06V 20/20; G06V 40/10; G06V 40/28
See application file for complete search history.

(56) References Cited

U.S. PATENT DOCUMENTS 5,828,197 A * 10/1998 Martin ................... A61B 34/76
318/560
7,971,156 B2 6/2011 Albertson et al.
(Continued)

FOREIGN PATENT DOCUMENTS

CN 103049761 8/2016
CN CN-119137576 A 12/2024
(Continued)

OTHER PUBLICATIONS

Darbar et al., Exploring Smartphone-enabled Text Selection in AR-HMD, Graphics Interface, May 2021, pp. 1-11 (Year: 2021).*
(Continued)

*Primary Examiner* — Motilewa Good-Johnson
(74) *Attorney, Agent, or Firm* — Schwegman Lundberg & Woessner, P.A.

(57) ABSTRACT

An Augmented Reality (AR) system is provided. The AR system generates a text scene object including virtual text objects based on a text and detect a text selection gesture made by a user of the AR system. The AR system generates a selection line based on a landmark of the user's hand. The AR system detects a confirmation gesture made by the user and sets a text selection start point at an intersection of the selection line with a start virtual text object of the one or more virtual text objects. The AR system detects a subsequent confirmation gesture made by the user, sets a text selection end point, and selects selected text from the text based on the text selection start point and the text selection end point.

15 Claims, 19 Drawing Sheets

(51) Int. Cl.
- *G06F 3/01* (2006.01)
- *G06T 19/00* (2011.01)
- *G06V 20/20* (2022.01)
- *G06V 40/10* (2022.01)
- *G06V 40/20* (2022.01)

(56) References Cited

U.S. PATENT DOCUMENTS

| | | |
|---|---|---|
| 7,996,793 B2 | 8/2011 | Latta et al. |
| 8,487,938 B2 | 7/2013 | Latta et al. |
| 8,854,433 B1 | 10/2014 | Rafii |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,377,863 B2 * | 6/2016 | Bychkov ............... G06F 3/017 |
| 9,705,831 B2 | 7/2017 | Spiegel |
| 9,742,713 B2 | 8/2017 | Spiegel et al. |
| 9,910,498 B2 | 3/2018 | Kutliroff et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,540,001 B1 | 1/2020 | Poupyrev et al. |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,642,458 B2 * | 5/2020 | Tan ..................... G06F 40/166 |
| 10,748,347 B1 | 8/2020 | Li et al. |
| 10,817,126 B2 * | 10/2020 | Kim .................... G06F 3/04815 |
| 10,956,724 B1 | 3/2021 | Terrano |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,145,135 B1 | 10/2021 | Ng et al. |
| 11,169,600 B1 | 11/2021 | Canberk et al. |
| 11,188,154 B2 | 11/2021 | Rakshit et al. |
| 11,227,626 B1 | 1/2022 | Krishnan Gorumkonda et al. |
| 11,232,643 B1 * | 1/2022 | Stevens ................. G06F 3/014 |
| 11,307,747 B2 | 4/2022 | Dancie et al. |
| 11,379,099 B2 * | 7/2022 | Cheng ................... G06F 3/0484 |
| 11,422,669 B1 * | 8/2022 | Ravasz ................. G06F 3/013 |
| 11,449,189 B1 * | 9/2022 | Bond ................... G06F 3/0482 |
| 11,500,514 B2 * | 11/2022 | Hildreth ............... G06F 3/04842 |
| 11,531,402 B1 | 12/2022 | Stolzenberg |
| 11,546,505 B2 | 1/2023 | Canberk |
| 11,567,578 B2 * | 1/2023 | Yang ................... G06F 3/04847 |
| 11,914,789 B2 * | 2/2024 | Chen ................... G06F 3/04815 |
| 2009/0012788 A1 | 1/2009 | Gilbert et al. |
| 2009/0228842 A1 * | 9/2009 | Westerman ........ G06V 30/1456 715/863 |
| 2009/0259865 A1 | 10/2009 | Sheynblat et al. |
| 2010/0328209 A1 * | 12/2010 | Nakao ................... G06F 3/0488 345/157 |
| 2011/0122130 A1 * | 5/2011 | Vesely ................... G06T 15/20 345/419 |
| 2011/0301934 A1 | 12/2011 | Tardif |
| 2012/0124516 A1 | 5/2012 | Friedman |
| 2012/0212406 A1 * | 8/2012 | Osterhout ............... G06F 3/005 345/156 |
| 2012/0218172 A1 * | 8/2012 | Border ............... G02B 27/0176 345/8 |
| 2012/0306772 A1 * | 12/2012 | Tan ..................... G06F 40/166 345/173 |
| 2012/0309532 A1 | 12/2012 | Ambrus et al. |
| 2013/0021288 A1 * | 1/2013 | Karkkainen .......... G06F 3/0488 345/173 |
| 2013/0278631 A1 | 10/2013 | Border et al. |
| 2013/0328770 A1 | 12/2013 | Parham |
| 2014/0007022 A1 | 1/2014 | Tocino Diaz et al. |
| 2014/0104320 A1 * | 4/2014 | Davidson ............ G06F 3/04886 345/681 |
| 2014/0125584 A1 * | 5/2014 | Xun ..................... G06F 3/011 345/156 |
| 2014/0163983 A1 * | 6/2014 | Kim ..................... G06F 3/167 704/235 |
| 2014/0171036 A1 | 6/2014 | Simmons |
| 2014/0184496 A1 | 7/2014 | Gribetz et al. |
| 2014/0201666 A1 * | 7/2014 | Bedikian ................. G06F 3/017 715/771 |
| 2014/0347329 A1 * | 11/2014 | Ware ................... G06F 3/04815 345/179 |
| 2015/0031299 A1 | 1/2015 | Holman et al. |
| 2015/0082246 A1 * | 3/2015 | Tan ..................... G06F 3/0488 715/823 |
| 2015/0120293 A1 | 4/2015 | Wohlert et al. |
| 2015/0130688 A1 | 5/2015 | Li et al. |
| 2015/0186708 A1 | 7/2015 | Katz |
| 2015/0309316 A1 | 10/2015 | Osterhout et al. |
| 2015/0332031 A1 | 11/2015 | Mistry et al. |
| 2015/0370320 A1 | 12/2015 | Connor |
| 2016/0018985 A1 | 1/2016 | Bennet et al. |
| 2016/0026253 A1 | 1/2016 | Bradski et al. |
| 2016/0077793 A1 | 3/2016 | Disano et al. |
| 2016/0109953 A1 | 4/2016 | Desh |
| 2016/0187654 A1 | 6/2016 | Border et al. |
| 2016/0209928 A1 | 7/2016 | Kandur Raja et al. |
| 2016/0232713 A1 * | 8/2016 | Lee ..................... G06F 3/011 |
| 2016/0283105 A1 | 9/2016 | Maloo et al. |
| 2016/0364091 A1 * | 12/2016 | Bernstein .............. G06F 3/0488 |
| 2016/0364138 A1 | 12/2016 | Luo et al. |
| 2016/0370882 A1 * | 12/2016 | McGrath ................. G06F 3/017 |
| 2017/0017393 A1 | 1/2017 | Luo et al. |
| 2017/0068849 A1 | 3/2017 | Lim et al. |
| 2017/0115742 A1 | 4/2017 | Xing et al. |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0308259 A1 | 10/2017 | Regnier |
| 2017/0322623 A1 | 11/2017 | Mckenzie et al. |
| 2017/0329515 A1 * | 11/2017 | Clement ............ G06F 3/04886 |
| 2017/0351910 A1 | 12/2017 | Elwazer et al. |
| 2018/0032146 A1 | 2/2018 | Yun |
| 2018/0088786 A1 * | 3/2018 | Abzarian ............ G06F 3/04186 |
| 2018/0158370 A1 | 6/2018 | Pryor |
| 2018/0181199 A1 | 6/2018 | Harvey et al. |
| 2018/0181245 A1 * | 6/2018 | Beck ................... G06F 3/04883 |
| 2018/0211405 A1 | 7/2018 | Zhang ................... G06T 7/70 |
| 2018/0267757 A1 * | 9/2018 | Segal ................... G06F 3/042 |
| 2018/0276897 A1 * | 9/2018 | Zhang ................ G02B 27/0172 |
| 2018/0307303 A1 | 10/2018 | Powderly et al. |
| 2019/0094981 A1 | 3/2019 | Bradski et al. |
| 2019/0121522 A1 | 4/2019 | Davis et al. |
| 2019/0146219 A1 | 5/2019 | Rodriguez, II |
| 2019/0155482 A1 * | 5/2019 | Chai ..................... G06F 3/011 |
| 2019/0258320 A1 * | 8/2019 | Yang ................... G06F 3/0426 |
| 2019/0362557 A1 * | 11/2019 | Lacey ................... G06F 3/167 |
| 2020/0012946 A1 | 1/2020 | Costa et al. |
| 2020/0097082 A1 | 3/2020 | Berenzweig et al. |
| 2020/0117282 A1 | 4/2020 | Lee et al. |
| 2020/0153450 A1 | 5/2020 | Lowe et al. |
| 2020/0249778 A1 | 8/2020 | Kim et al. |
| 2020/0302699 A1 * | 9/2020 | Cantor ................... G06T 11/60 |
| 2020/0326966 A1 * | 10/2020 | Tsirkin ................... G06F 1/28 |
| 2020/0341580 A1 | 10/2020 | Rosenbaum et al. |
| 2020/0387214 A1 | 12/2020 | Ravasz et al. |
| 2020/0387229 A1 | 12/2020 | Ravasz et al. |
| 2020/0387287 A1 * | 12/2020 | Ravasz ................. G06F 3/011 |
| 2020/0410755 A1 * | 12/2020 | Nakata ................... G06F 3/014 |
| 2021/0011612 A1 | 1/2021 | Dancie et al. |
| 2021/0042010 A1 | 2/2021 | Kim |
| 2021/0065455 A1 | 3/2021 | Beith et al. |
| 2021/0074016 A1 | 3/2021 | Li et al. |

(56) References Cited

U.S. PATENT DOCUMENTS

| | | | |
|---|---|---|---|
| 2021/0089801 A1* | 3/2021 | Durandet | G06F 3/0488 |
| 2021/0110646 A1 | 4/2021 | Dixit et al. | |
| 2021/0124417 A1 | 4/2021 | Ma | |
| 2021/0166732 A1 | 6/2021 | Shaburova et al. | |
| 2021/0173207 A1 | 6/2021 | Bamberger et al. | |
| 2021/0173480 A1 | 6/2021 | Osterhout et al. | |
| 2021/0174034 A1 | 6/2021 | Retek et al. | |
| 2021/0241529 A1 | 8/2021 | Cowburn et al. | |
| 2021/0247896 A1 | 8/2021 | Tanemura et al. | |
| 2021/0248407 A1* | 8/2021 | Hirai | G06F 3/04845 |
| 2021/0271342 A1* | 9/2021 | Tomizawa | G06F 3/017 |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0319617 A1 | 10/2021 | Ahn et al. | |
| 2021/0358330 A1 | 11/2021 | Johnson et al. | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2021/0407203 A1 | 12/2021 | Canberk et al. | |
| 2022/0059159 A1 | 2/2022 | Holland et al. | |
| 2022/0100267 A1* | 3/2022 | Robinson | G06F 3/012 |
| 2022/0122335 A1* | 4/2022 | Robinson | G06F 3/0488 |
| 2022/0179497 A1 | 6/2022 | Jung et al. | |
| 2022/0188539 A1 | 6/2022 | Chan et al. | |
| 2022/0206588 A1 | 6/2022 | Canberk et al. | |
| 2022/0236795 A1 | 7/2022 | Jonker et al. | |
| 2022/0253146 A1 | 8/2022 | Erivantcev et al. | |
| 2022/0262074 A1* | 8/2022 | Chen | G06F 3/011 |
| 2022/0276729 A1* | 9/2022 | Gutierrez | G06F 3/03545 |
| 2022/0291753 A1 | 9/2022 | Erivantcev et al. | |
| 2022/0300730 A1 | 9/2022 | Eirinberg et al. | |
| 2022/0300731 A1 | 9/2022 | Eirinberg et al. | |
| 2022/0301231 A1 | 9/2022 | Eirinberg et al. | |
| 2022/0308669 A1* | 9/2022 | Beck | G06F 3/016 |
| 2022/0326781 A1 | 10/2022 | Hwang et al. | |
| 2022/0334649 A1 | 10/2022 | Hwang et al. | |
| 2022/0335673 A1* | 10/2022 | Jang | G06T 11/00 |
| 2022/0375174 A1 | 11/2022 | Arya et al. | |
| 2023/0072423 A1* | 3/2023 | Osborn | G16H 20/30 |
| 2023/0096728 A1* | 3/2023 | Hébert | G06V 10/82 |
| | | | 382/156 |
| 2023/0229240 A1 | 7/2023 | Chen et al. | |
| 2023/0259697 A1* | 8/2023 | Fan | G06F 9/451 |
| | | | 715/256 |
| 2023/0384928 A1 | 11/2023 | Moll et al. | |

FOREIGN PATENT DOCUMENTS

| | | |
|---|---|---|
| CN | CN-119213468 A | 12/2024 |
| EP | 3707693 | 9/2020 |
| EP | 4172726 A1 | 5/2023 |
| EP | 4172730 A1 | 5/2023 |
| KR | 20200038845 | 4/2020 |
| KR | 20210082950 | 7/2021 |
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | WO-2022060549 A3 | 4/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | WO-2023211702 A1 | 11/2023 |
| WO | WO-2023224982 A1 | 11/2023 |
| WO | WO-2023235672 A1 | 12/2023 |

OTHER PUBLICATIONS

Ro et al., AR Pointer: Advanced Ray-Casting Interface Using Laser Pointer Metaphor for Object Manipulation in 3D Augmented Reality Environment, Applied Science, Jul. 2019, pp. 1-18 (Year: 2019).*

"U.S. Appl. No. 17/804,818, Non Final Office Action dated Nov. 25, 2022", 21 pgs.

"U.S. Appl. No. 17/804,818, Response filed Feb. 27, 2023 to Non Final Office Action dated Nov. 25, 2022", 11 pgs.

"U.S. Appl. No. 17/804,818, Final Office Action dated Mar. 30, 2023", 21 pgs.

"U.S. Appl. No. 17/804,818, Response filed Jun. 30, 2023 to Final Office Action dated Mar. 30, 2023", 12 pgs.

"International Application Serial No. PCT/US2023/018642, International Search Report mailed Jul. 26, 2023", 3 pgs.

"International Application Serial No. PCT/US2023/018642, Written Opinion mailed Jul. 26, 2023", 4 pgs.

"U.S. Appl. No. 17/804,818, Non Final Office Action mailed Aug. 3, 2023", 26 pgs.

"International Application Serial No. PCT/US2023/022367, International Search Report mailed Sep. 8, 2023", 3 pgs.

"International Application Serial No. PCT US2023 022367, Written Opinion mailed Sep. 8, 2023", 3 pgs.

"International Application Serial No. PCT/US2023/067456, International Search Report mailed Sep. 11, 2023", 4 pgs.

"International Application Serial No. PCT/US2023/067456, Written Opinion mailed Sep. 11, 2023", 4 pgs.

"U.S. Appl. No. 17/729,808, Non Final Office Action mailed Dec. 7, 2023", 10 pgs.

"U.S. Appl. No. 17/804,818, Final Office Action mailed Dec. 27, 2023", 31 pgs.

"U.S. Appl. No. 17/804,818, Response filed Dec. 4, 2023 to Non-Final Office Action mailed Aug. 3, 2023", 12 pgs.

"U.S. Appl. No. 17/729,808, Final Office Action mailed Mar. 25, 2024", 12 pgs.

"U.S. Appl. No. 17/729,808, Response filed Mar. 7, 2024 to Non Final Office Action mailed Dec. 7, 2023", 10 pgs.

"U.S. Appl. No. 17/804,818, Non Final Office Action mailed Apr. 25, 2024", 27 pgs.

"U.S. Appl. No. 17/804,818, Response filed Mar. 27, 2024 to Final Office Action mailed Dec. 27, 2023", 12 pgs.

"U.S. Appl. No. 17/729,808, Corrected Notice of Allowability mailed Aug. 29, 2024", 3 pgs.

"U.S. Appl. No. 17/729,808, Notice of Allowance mailed Aug. 14, 2024", 8 pgs.

"U.S. Appl. No. 17/729,808, Response filed Jun. 25, 2024 to Final Office Action mailed Mar. 25, 2024", 9 pgs.

"U.S. Appl. No. 17/804,818, Corrected Notice of Allowability mailed Sep. 5, 2024", 3 pgs.

"U.S. Appl. No. 17/804,818, Examiner Interview Summary mailed Jul. 29, 2024", 3 pgs.

"U.S. Appl. No. 17/804,818, Notice of Allowance mailed Aug. 23, 2024", 11 pgs.

"U.S. Appl. No. 17/804,818, Response filed Jul. 25, 2024 to Non Final Office Action mailed Apr. 25, 2024", 14 pgs.

"U.S. Appl. No. 17/729,808, Notice of Allowance mailed Nov. 20, 2024", 9 pgs.

"U.S. Appl. No. 17/804,818, Notice of Allowance mailed Dec. 9, 2024", 13 pgs.

"International Application Serial No. PCT/US2023/018642, International Preliminary Report on Patentability mailed Nov. 7, 2024", 6 pgs.

"International Application Serial No. PCT/US2023/022367, International Preliminary Report on Patentability mailed Nov. 28, 2024", 5 pgs.

"International Application Serial No. PCT/US2023/067456, International Preliminary Report on Patentability mailed Dec. 12, 2024", 6 pgs.

* cited by examiner

HAND-TRACKED TEXT SELECTION AND MODIFICATION

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
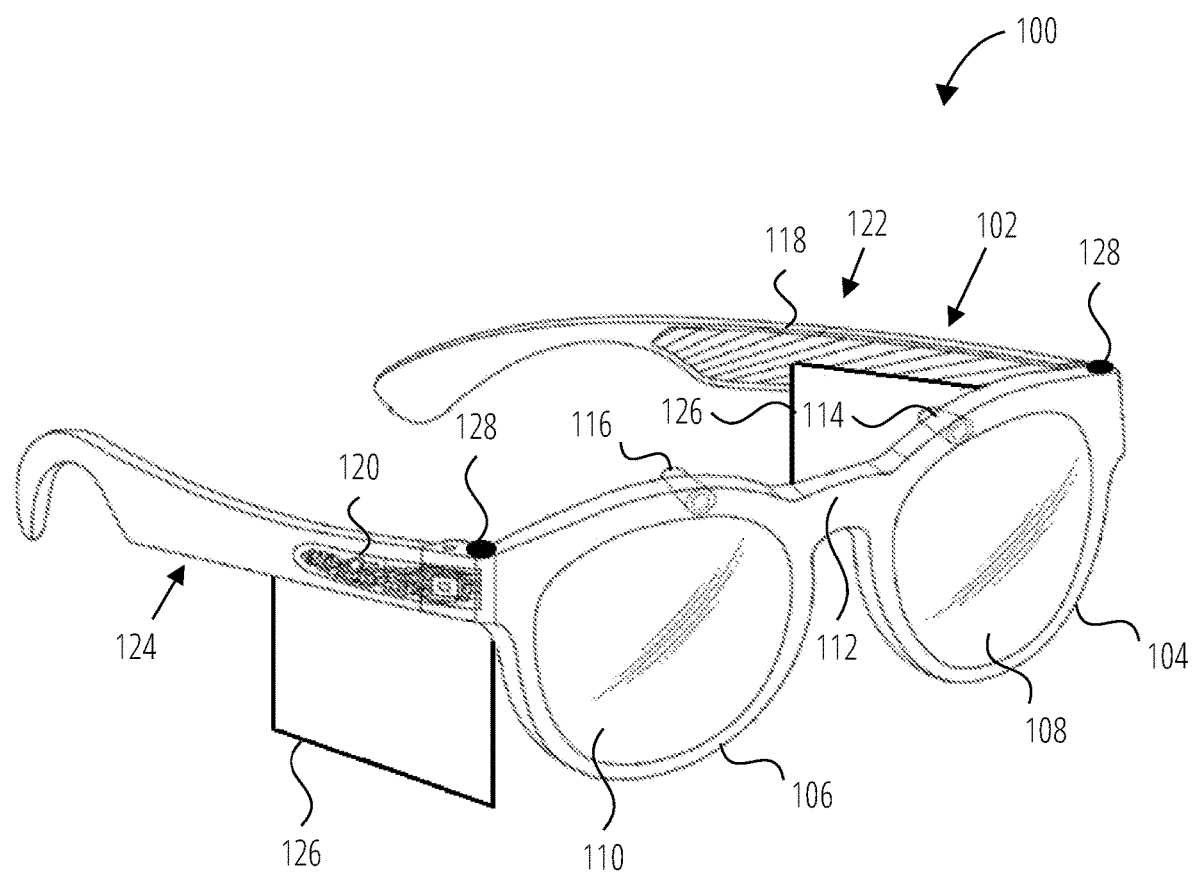
FIG. 1 is a perspective view of a head-worn device, in accordance with some examples.

AR systems are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

An input modality that may be utilized with AR systems is hand-tracking combined with Direct Manipulation of Virtual Objects (DMVO) where a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

Gestures that do not involve DMVO provide another input modality suitable for use with AR systems. Gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in the real-world scene environment, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

Head-tracking information provides another input modality suitable for use with AR systems. AR system continually gathers and uses updated sensor data describing movements of the AR system to determine changes in the relative position and orientation relative to physical objects in the real-world scene environment. The sensor data permits detection of a focus of the user on virtual objects and physical objects by the AR device within the field of view of the user.

By combining hand-tracked DMVO, gesture, and head-tracking input modalities, an improved text entry user interface is provided to a user of an AR system. The AR system uses a combination of gesture and DMVO methodologies to provide for the user's selection and modification of text within a text scene object of the AR experience. The user makes a gesture to open or invoke a text selection and modification user interface and makes another gesture to begin selecting text from the text scene object. The AR system provides a virtual stylus to the user. The user uses the virtual stylus to select text to modify. With a free hand, a user makes gestures to set text selection points in a location pointed to by the virtual stylus.

In some examples, instead of a virtual stylus, the AR system detects a focus of a user to select portions of text to modify. The user focuses on a portion of the text where the user wants to set an end point, and the user makes gestures to set text selection points defining the selected text.

In some examples, the AR system projects a virtual keyboard onto a physical surface and the user interacts with the virtual keyboard and with text displayed in a text scene object. The physical surface provides haptic feedback to the user.

Other technical features may be readily apparent to one skilled in the art from the following figures, descriptions, and claims.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 802 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
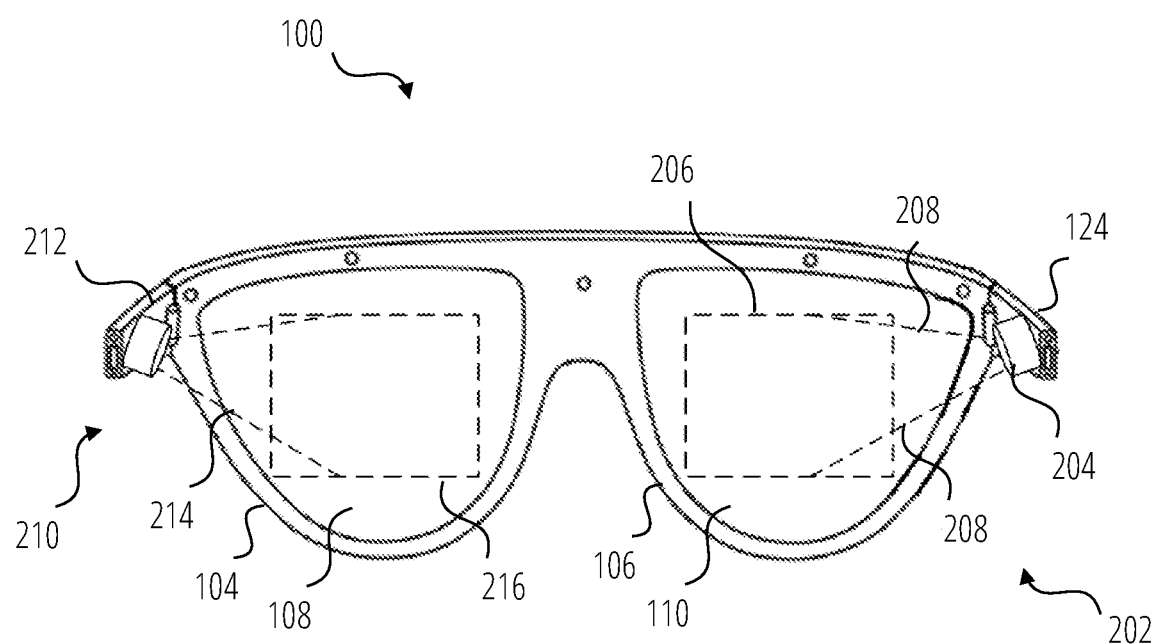
FIG. 2 is a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 826 illustrated in FIG. 8), and/or hand movements, locations, and positions detected by the glasses 100.

Figure 3:
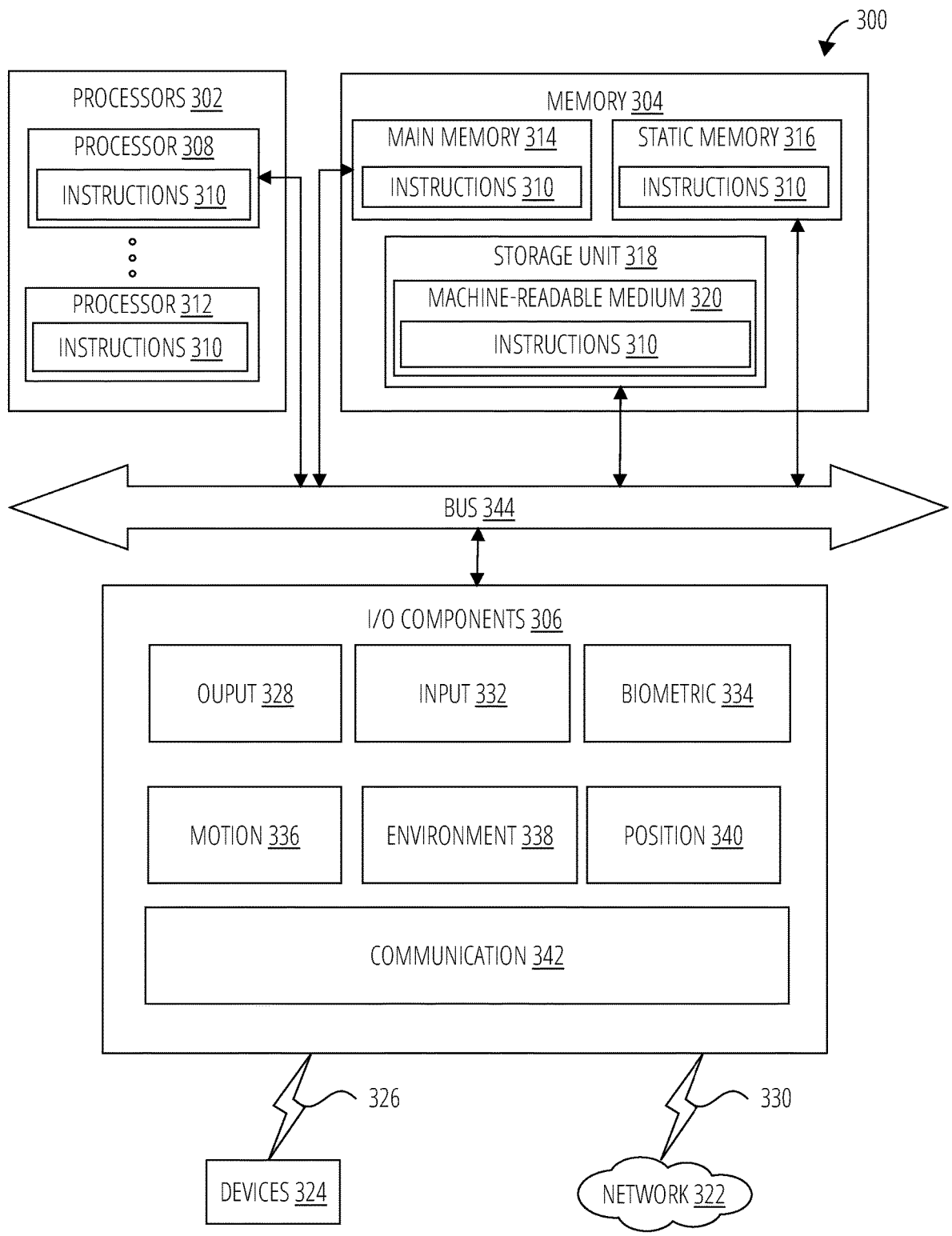
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a computing apparatus 300 within which instructions 310 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 310 may cause the computing apparatus 300 to execute any one or more of the methods described herein. The instructions 310 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the computing apparatus 300. Further, while a single computing apparatus 300 is illustrated, the term "machine" may also be taken to include a collection of machines that individually or jointly execute the instructions 310 to perform any one or more of the methodologies discussed herein.

The computing apparatus 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the computing apparatus 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 306 may include biometric components 334, motion components 336, environmental components 338, and position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units, acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 306 further include communication components 342 operable to couple the computing apparatus 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
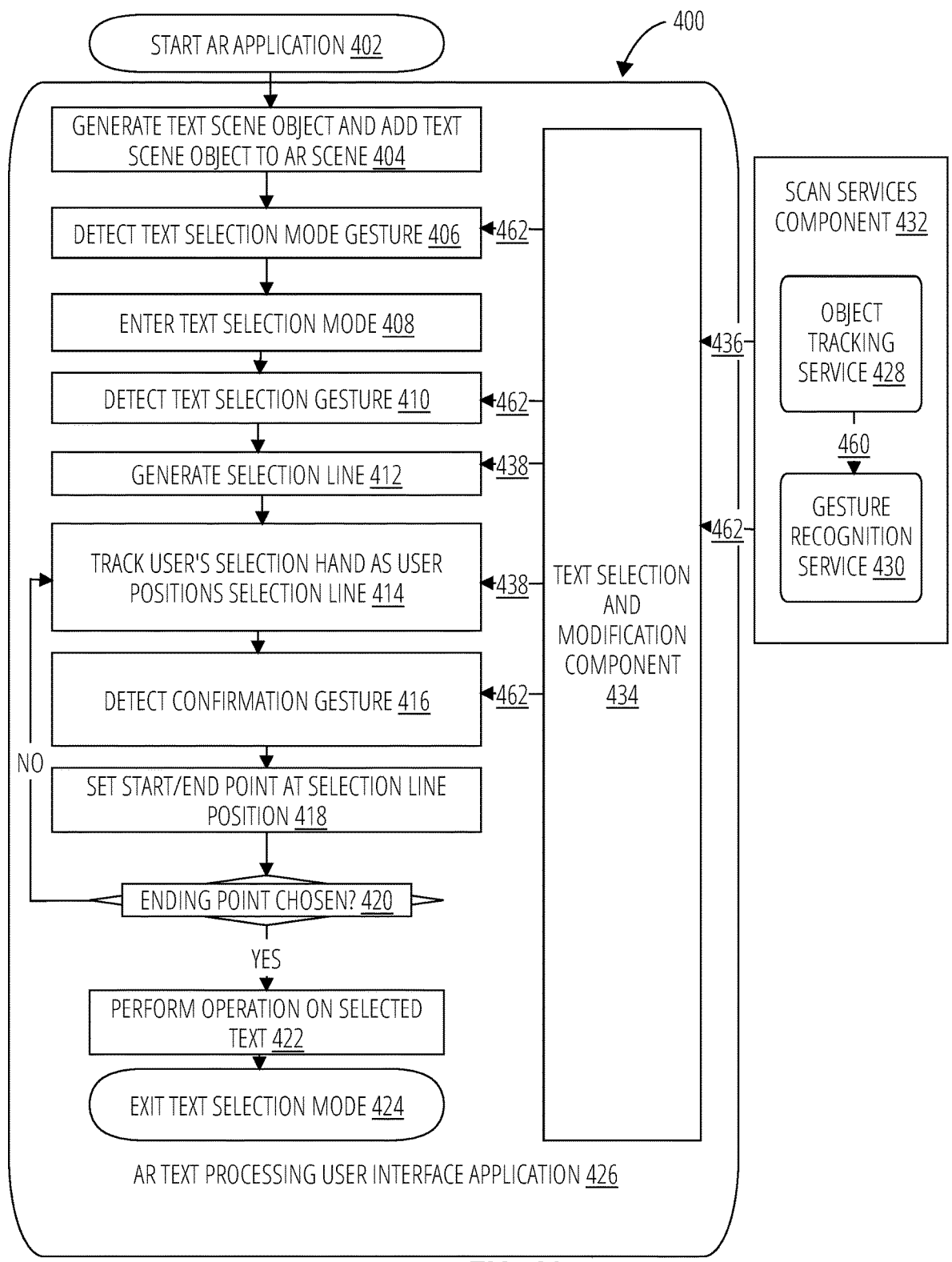
FIG. 4A is a process flow diagram of a text selection and modification process in accordance with some examples.
Figure 4B:
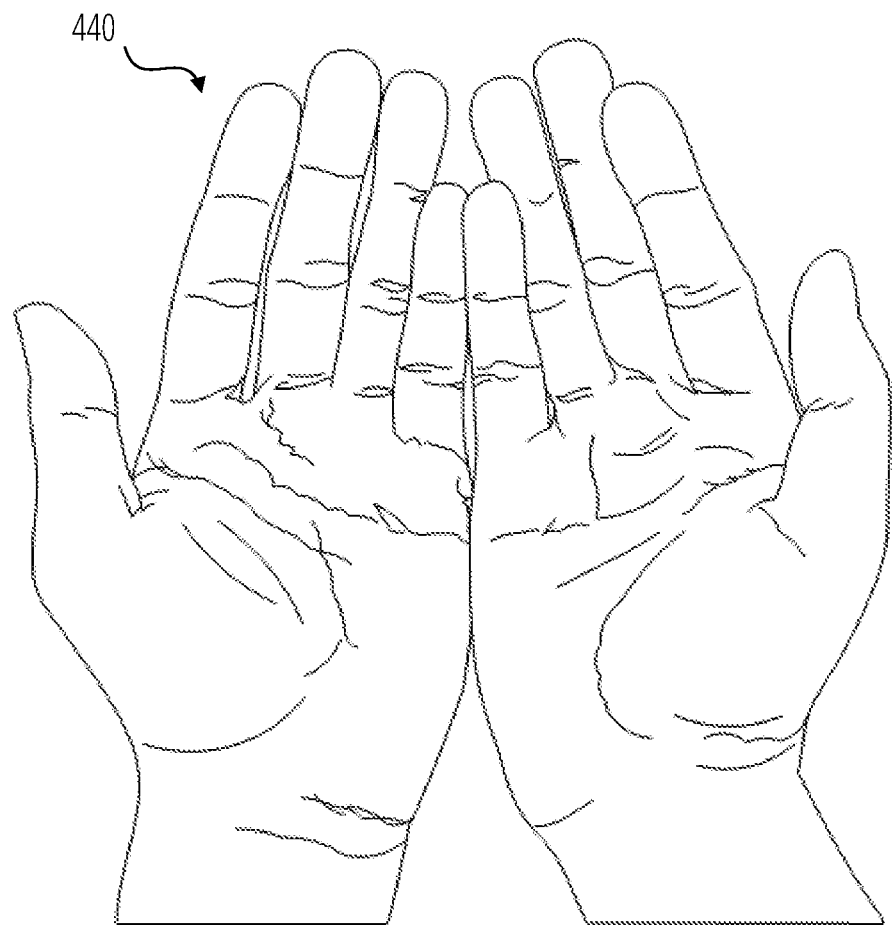
FIG. 4B illustrates a hand gesture in accordance with some examples.
Figure 4C:
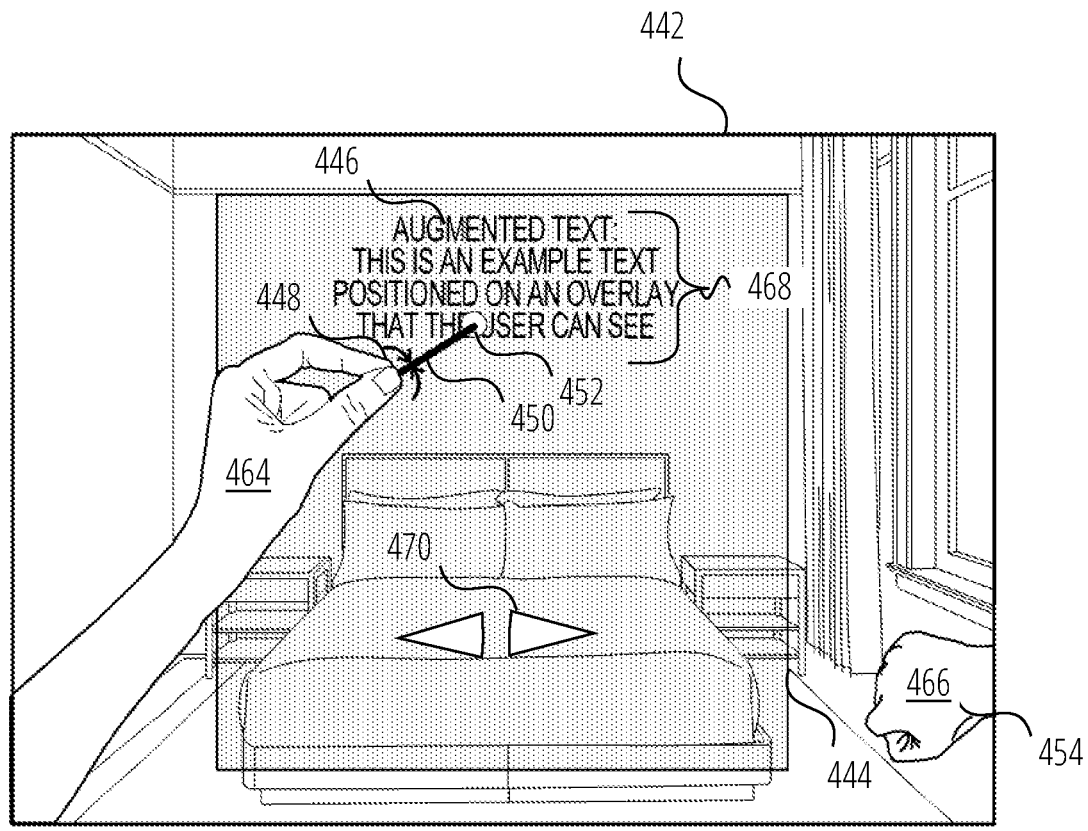
FIG. 4C, FIG. 4D, and FIG. 4E are illustrations of an AR augmented scene including a text scene object in accordance with some examples.
Figure 4D:
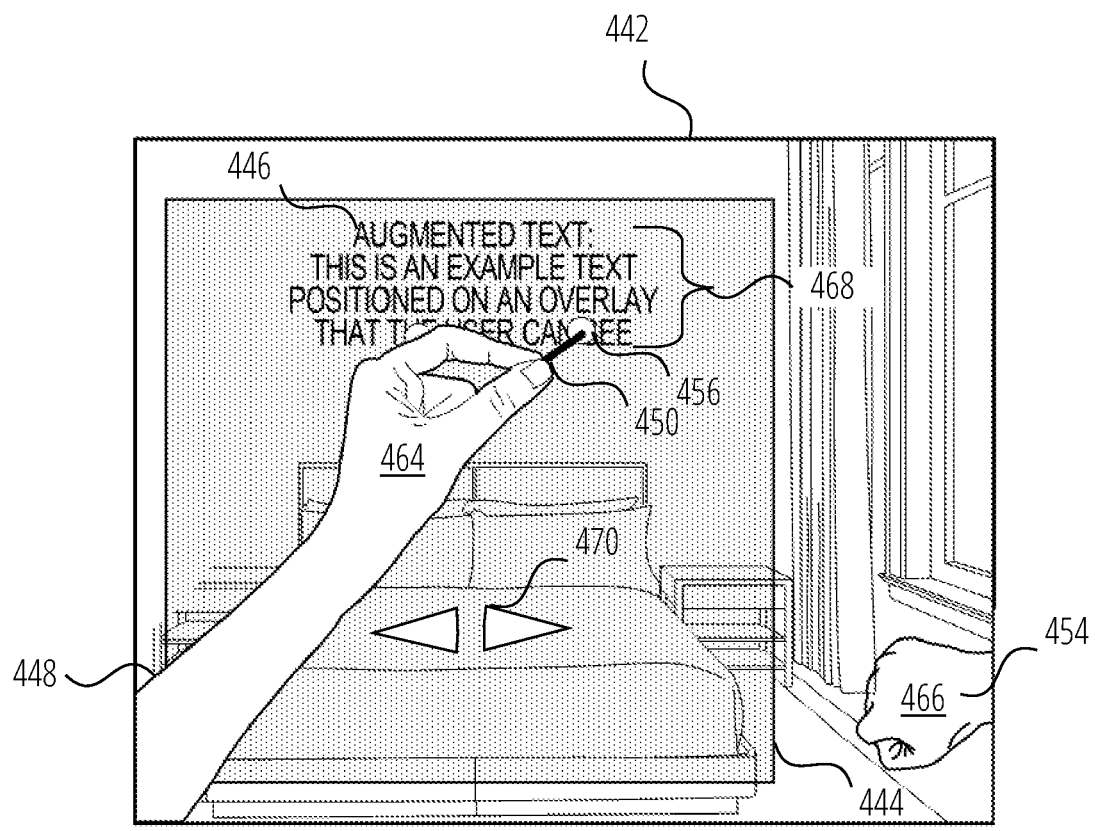
Figure 4E:
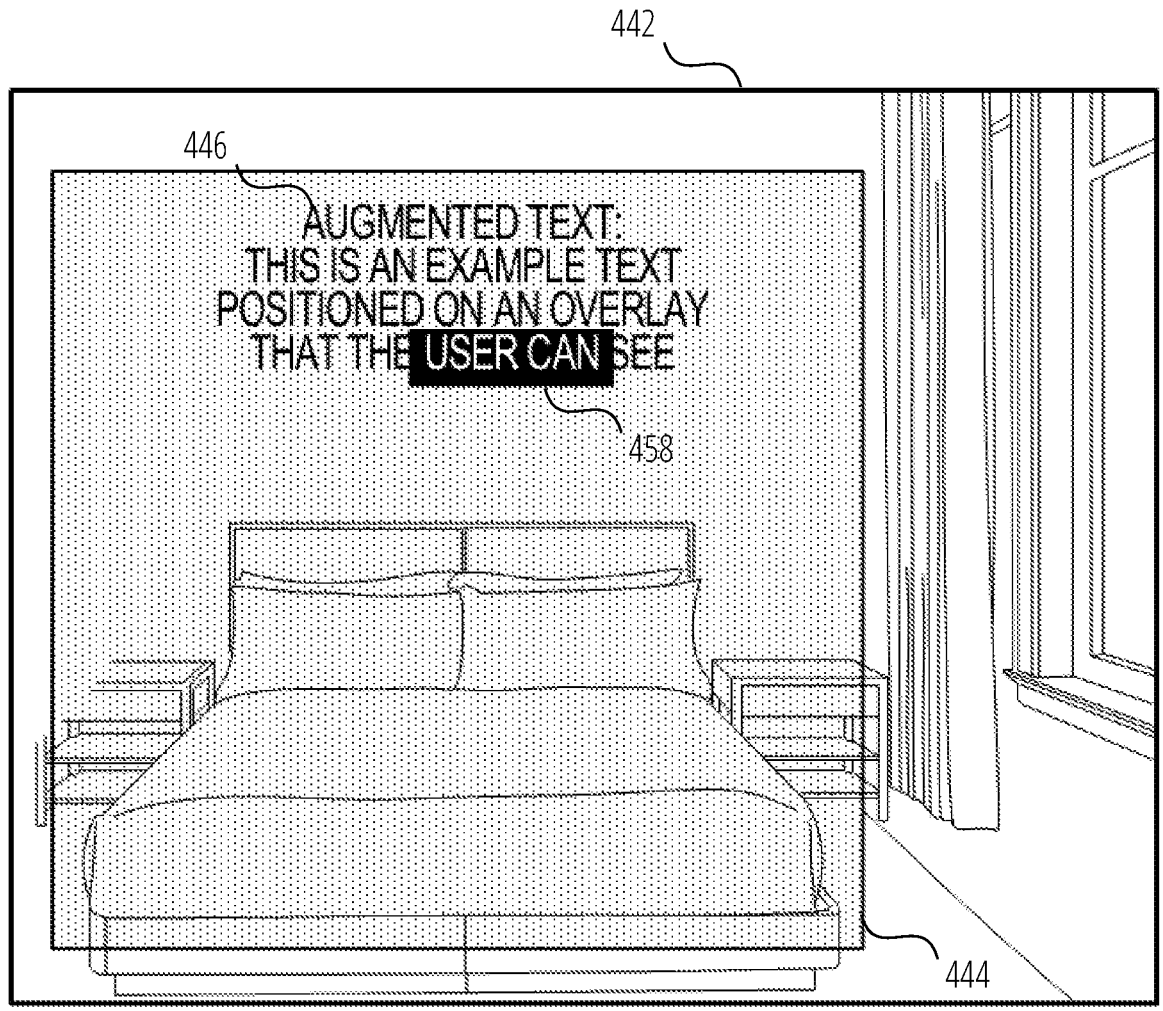

FIG. 4A is a process flow diagram of a text selection and modification process 400 of an AR system, such as, but not limited to, glasses 100 in accordance with some examples. FIG. 4B is an illustration of a hand gesture in accordance with some examples. FIG. 4C, FIG. 4D, and FIG. 4E are illustrations of an AR overlay 442 including a text scene object 444 having text 446 in accordance with some examples. During the text selection and modification process 400, the AR system utilizes gesture recognition methodologies and DMVO methodologies to implement a user interface for text selection and modification during an AR experience provided by the AR system.

In operation 402, the AR system starts the text selection and modification process 400 by invoking an AR text processing user interface application 426. The AR text processing user interface application 426 connects to a scan services component 432. The scan services component 432 includes a gesture recognition service 430 that continuously recognizes gestures made by a user while using the AR system, and an object tracking service 428 that continuously tracks objects in the field of view of the AR system.

The object tracking service 428 scans for, detects, and tracks objects in a real-world scene including landmarks on portions of the user's upper body, arms, and hands in the real-world scene. In some examples, the object tracking service 428 receives real-world scene video frame data of a real-world scene from one or more cameras of the AR system, such as cameras 114 and 116 of FIG. 1, and extracts features of objects including the user's upper body, arms, and hands from the real-world scene video frame data. The object tracking service 428 generates current tracking data 436 based on the extracted features. The current tracking data 436 includes current object data of objects in the real-world scene, and current skeletal model data 460 including identification, location, and categorization data of landmarks associated with the user's upper body, arms, and hands. The object tracking service 428 communicates the current skeletal model data 460 to the gesture recognition service 430. In addition, the object tracking service 428 makes the current tracking data 436 available to the text selection and modification component 434.

The gesture recognition service 430 receives the current skeletal model data 460 from the object tracking service 428 and compares the current skeletal model data 460 to previously generated gesture model data. The gesture recognition service 430 detects a detected gesture on the basis of the comparison of the current skeletal model data 460 with the gesture model data and generates current detected gesture data 462 based on the detected gesture. In additional examples, the gesture recognition service 430 determines the detected gesture on the basis of categorizing the current skeletal model data 460 using artificial intelligence methodologies and a gesture model previously generated using machine learning methodologies.

In operation 404, the AR system generates the text scene object 444 and adds the text scene object 444 to the AR overlay 442 provided by the AR system. For example, the AR device generates the text scene object 444 including one or more virtual text objects 468 based on the text 446. The one or more virtual text objects 468 correspond to respective individual characters of the text 446.

In operation 406, the AR system detects a text selection mode gesture, such as, but not limited to, text selection mode gesture 440 of FIG. 4B, made by the user based on current detected gesture data 462 received from the text selection and modification component 434. In operation 408, in response to detecting the text selection mode gesture 440, the AR system provides a text selection and modification user interface as part of text scene object 444 and enters into a text selection mode.

In operation 410, the AR system detects a defined text selection gesture 448, such as, but not limited to, a pinching gesture, made by the user using one of their hands as a selection hand 464, such as, but not limited to, the user's left hand, based on current detected gesture data 462 received from the text selection and modification component 434.

In operation 412, in response to detecting the text selection gesture 448, the AR system generates a selection line 450 based on a landmark of the user's hand. For example, the AR system projects the selection line 450 from a landmark of the user's hand making the text selection gesture 448 such that the selection line 450 projects orthogonally toward a surface of the virtual text objects 468 of the text scene object 444. The selection line functions as a virtual stylus for the user. In an additional example, the AR system determines a landmark for the user's handheld in the text selection gesture 448, such as, but not limited to, a middle point of two of the user's fingers that perform the text selection gesture 448, based on current skeletal model data 438 received from the text selection and modification component 434. The projected selection line 450 is a line collider that the user moves to select text 446. The AR system detects collisions between the selection line 450 and the virtual text objects 468 of the text scene object 444 as the user positions the selection line 450 within the virtual text objects 468. The AR system determines user interactions by the user with the virtual text objects 468 based on the detected collisions.

In operation 414, the AR system tracks the user's selection hand making the text selection gesture 448 as the user moves their selection hand to position the selection line 450 to a position at a text selection start point 452 in the virtual text objects of the text scene object 444 based on current skeletal model data 438 received from the text selection and modification component 434.

In operation 416, the AR system detects a confirmation gesture 454, such as, but not limited to, a first gesture, made by the user using a confirmation hand 466, such as, but not limited to, the user's right hand, based on current detected gesture data 462 received by the AR system from the text selection and modification component 434.

In operation 418, the AR system sets a text selection start point 452 for a text selection from the text 446 at a position of an intersection of the selection line 450 with a start virtual text object of the virtual text objects 468 of the text scene object 444. The text selection start point 452 is a starting point in text 446 of text that will be selected from text 446.

In operation 420, the AR system determines if a text selection end point 456 has been set. The AR system repeats operation 414, operation 416, and operation 418 to set the text selection end point 456 on the basis of determining that the text selection end point 456 has not been set.

In repeated operation 414, the AR system tracks the user's selection hand making the text selection gesture 448 as the user moves their selection hand to position selection line 450 at a position of a text selection end point 456 in the virtual text objects 468 based on current skeletal model data 438 received from the text selection and modification component 434.

In some examples, the AR overlay 442 includes one or more user selectable virtual direction keys, such as, but not limited to, direction keys 470, that the user may use to perform a text selection once the initial cursor placement is set.

In repeated operation 416, the AR system detects a subsequent confirmation gesture 454 made by the user using their confirmation hand 466 based on the current detected gesture data 462 received by the AR system from the text selection and modification component 434.

In repeated operation 418, the AR system sets a text selection end point 456 for a text selection from the text 446 to a position of an intersection of the selection line 450 with an end virtual text object of the virtual text objects 468. The text selection end point is an end point in text 446 of text that will be selected from text 446.

In repeated operation 420, the AR system determines if the text selection end point 456 has been set. The AR system selects selected text 458 between the text selection start point 452 and the text selection end point 456 from text 446 on the basis of determining that the text selection end point 456 has been set. In operation 422, the AR system highlights the selected text 458 and performs a text operation on the selected text 458. The text operation can be a modification of the selected text 458, cutting the selected text 458, copying the selected text 458, changing the appearance of the selected text 458, changing the formatting of the selected text, etc.

Figure 6A:
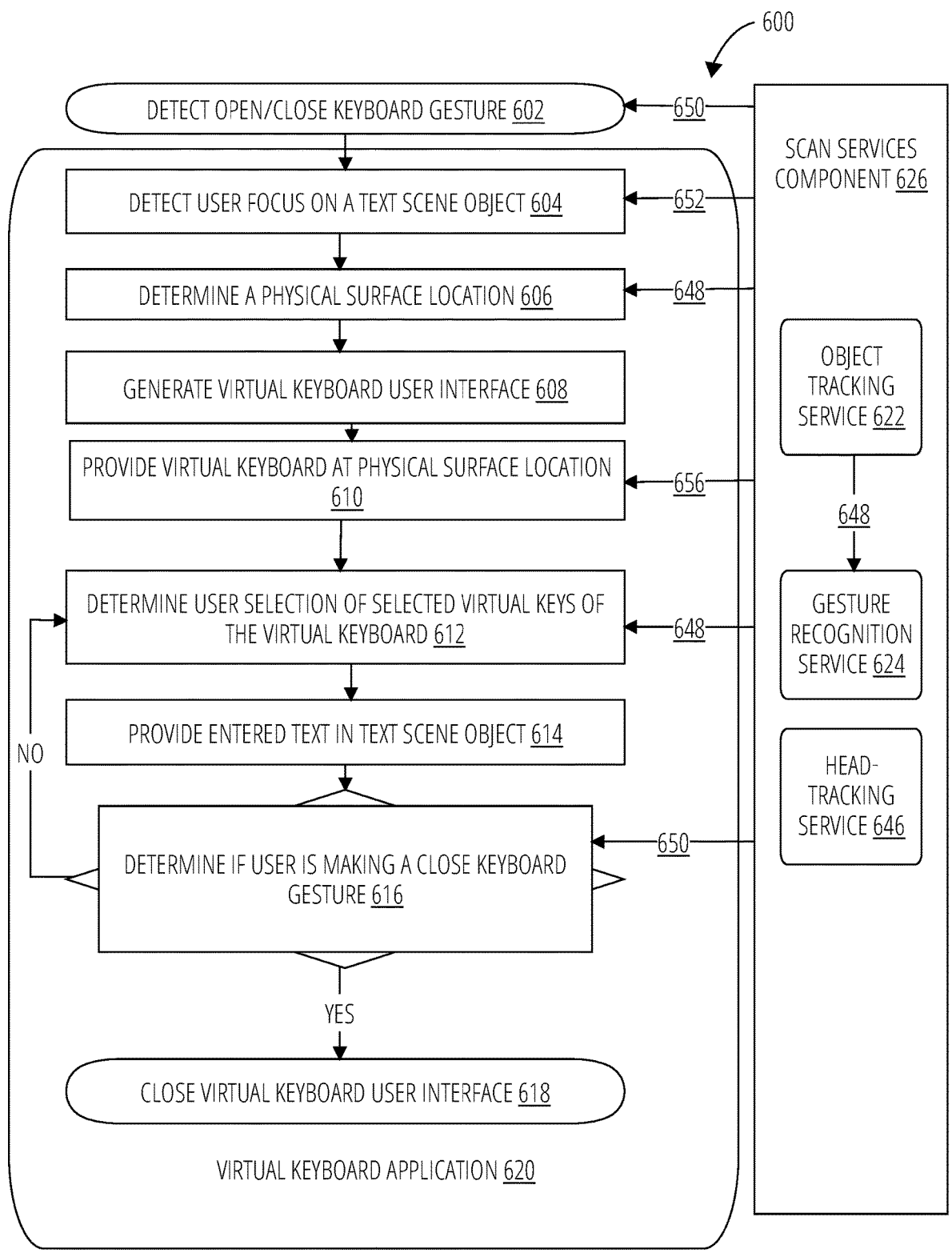
FIG. 6A is a process flow diagram of a virtual keyboard process in accordance with some examples.
Figure 6B:
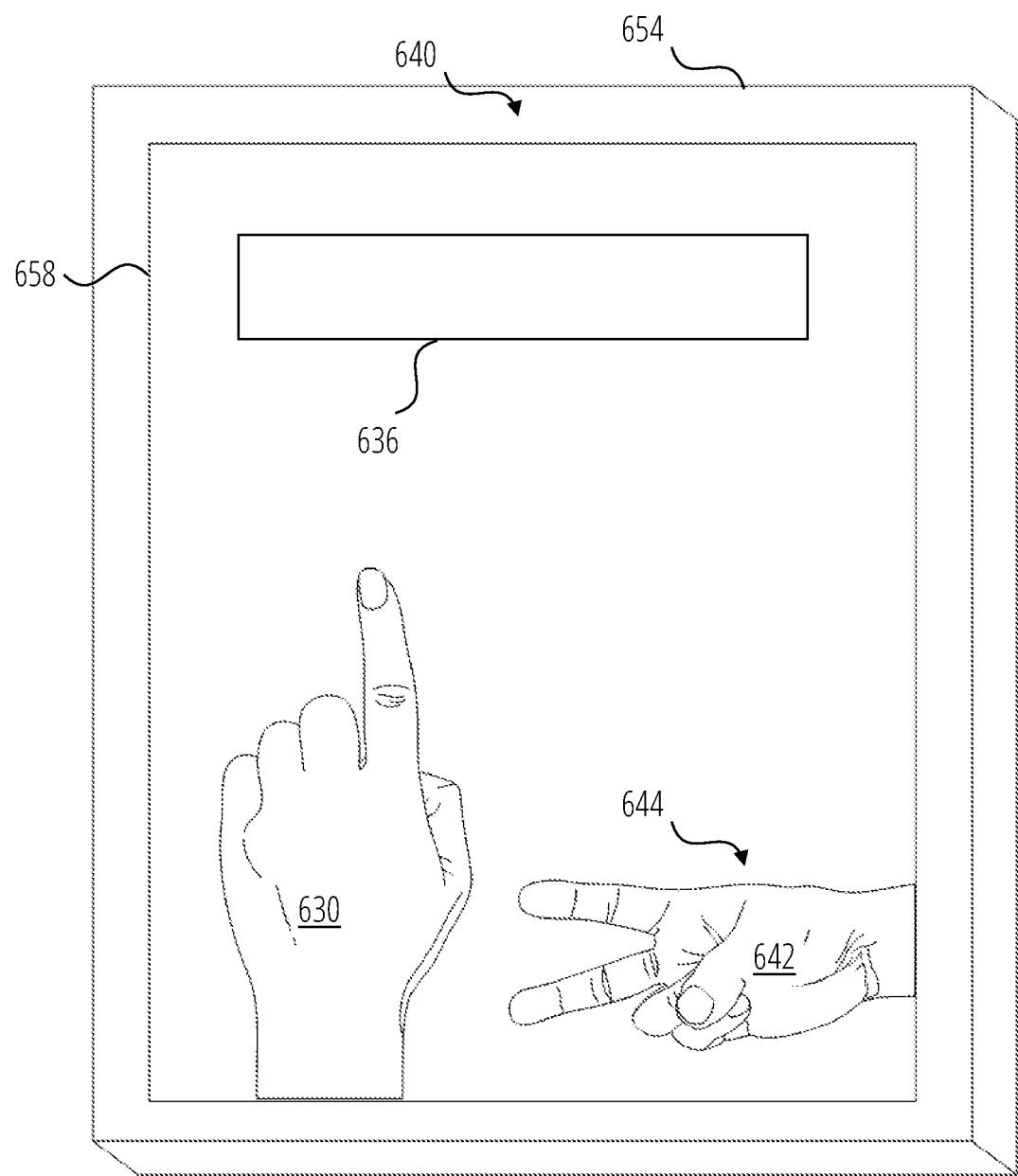
FIG. 6B is an illustration of a physical surface selection process in accordance with some examples.
Figure 6C:
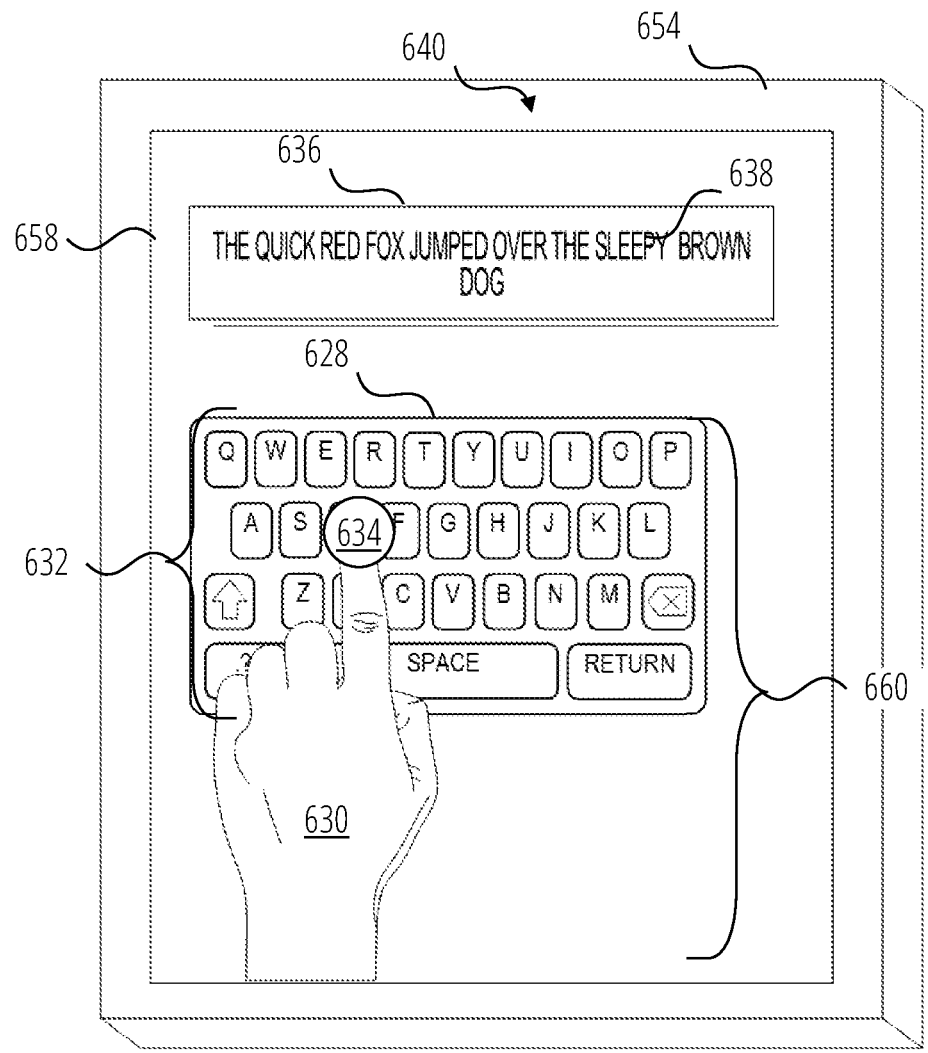
FIG. 6C is an illustration of a virtual keyboard user interface in accordance with some examples.

In some examples, the AR system generates a virtual keyboard, such as, but not limited to, virtual keyboard 628 of FIG. 6C, that is provided to the user in the AR overlay 442. The user may use the virtual keyboard 628 to edit the selected text 458 as described herein.

In some examples, the AR system generates a user selectable list of text modifications that are available for modifying the text, such as, but not limited to, cutting selected text 458, copying the selected text 458, changing the appearance of the selected text 458, changing the formatting of the selected text, etc.

In operation 424, the AR system exits the text selection mode and terminates the AR text processing user interface application 426.

In some examples, the user makes a text selection mode exit gesture, such as, but not limited to, text selection mode gesture 440, to terminate the AR text processing user interface application 426.

In some examples, the AR overlay 442 includes a user selectable exit button (not shown) that when selected by the user terminates the AR text processing user interface application 426.

In some examples, the AR text processing user interface application 426 terminates after an operation is completed on the selected text 458.

Figure 5A:
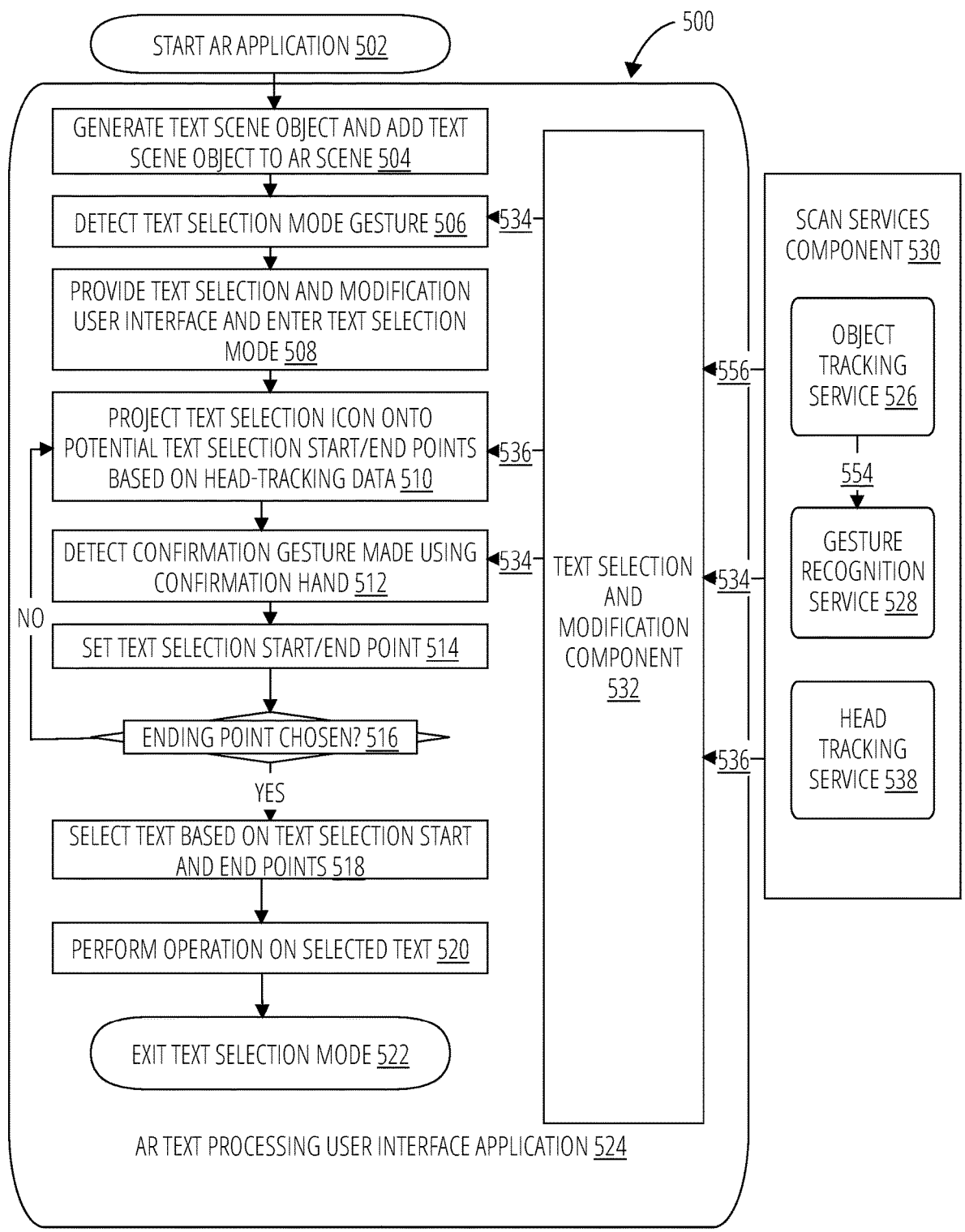
FIG. 5A is a process flow diagram of a text selection and modification process in accordance with some examples.
Figure 5B:
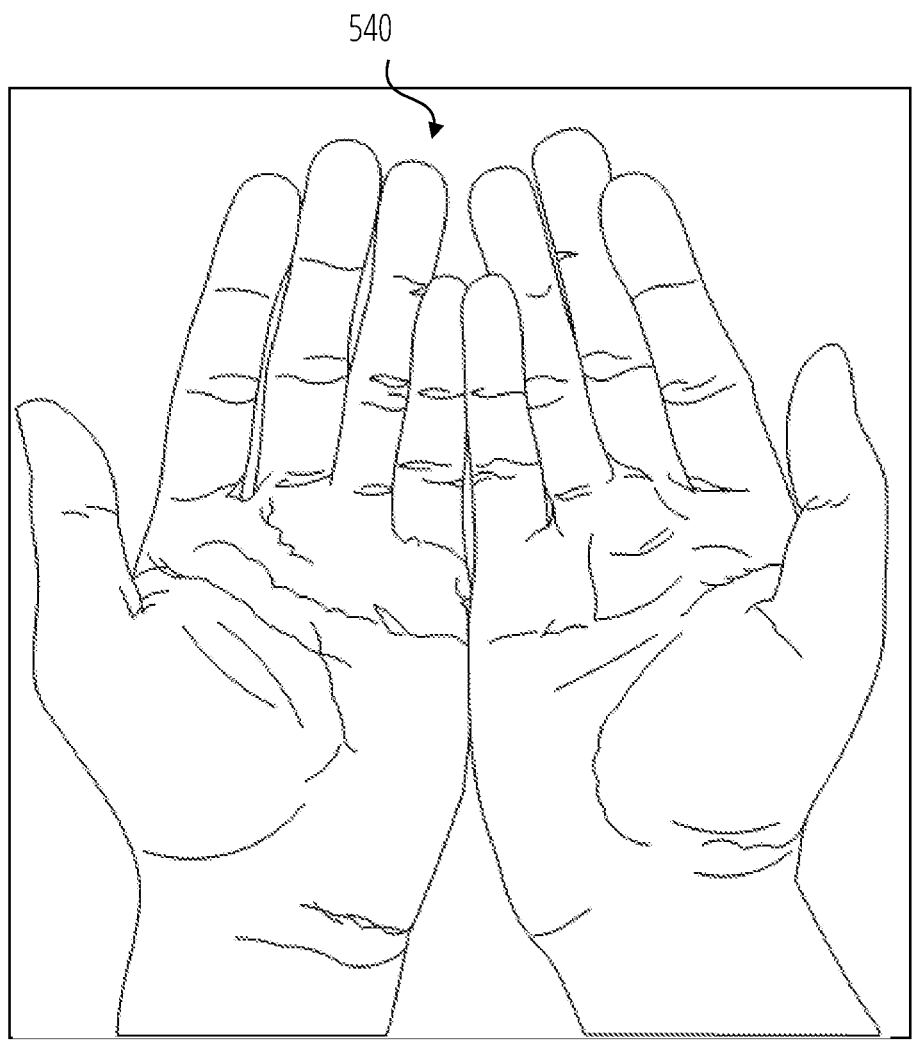
FIG. 5B is another illustration of a gesture in accordance with some examples.
Figure 5C:
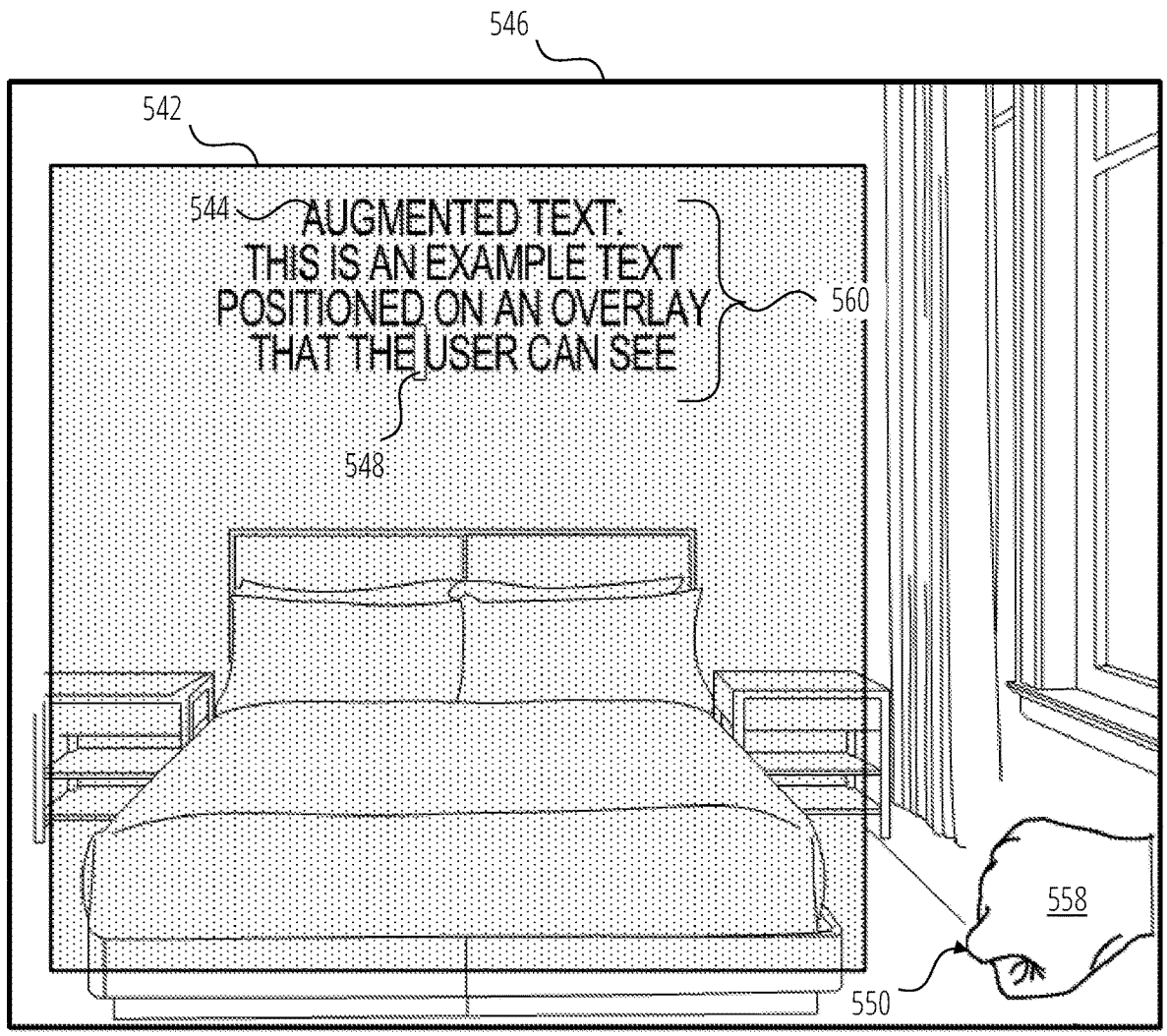
FIG. 5C, FIG. 5D, and FIG. 5E are illustrations of another AR augmented scene including a text scene object in accordance with some examples.
Figure 5D:
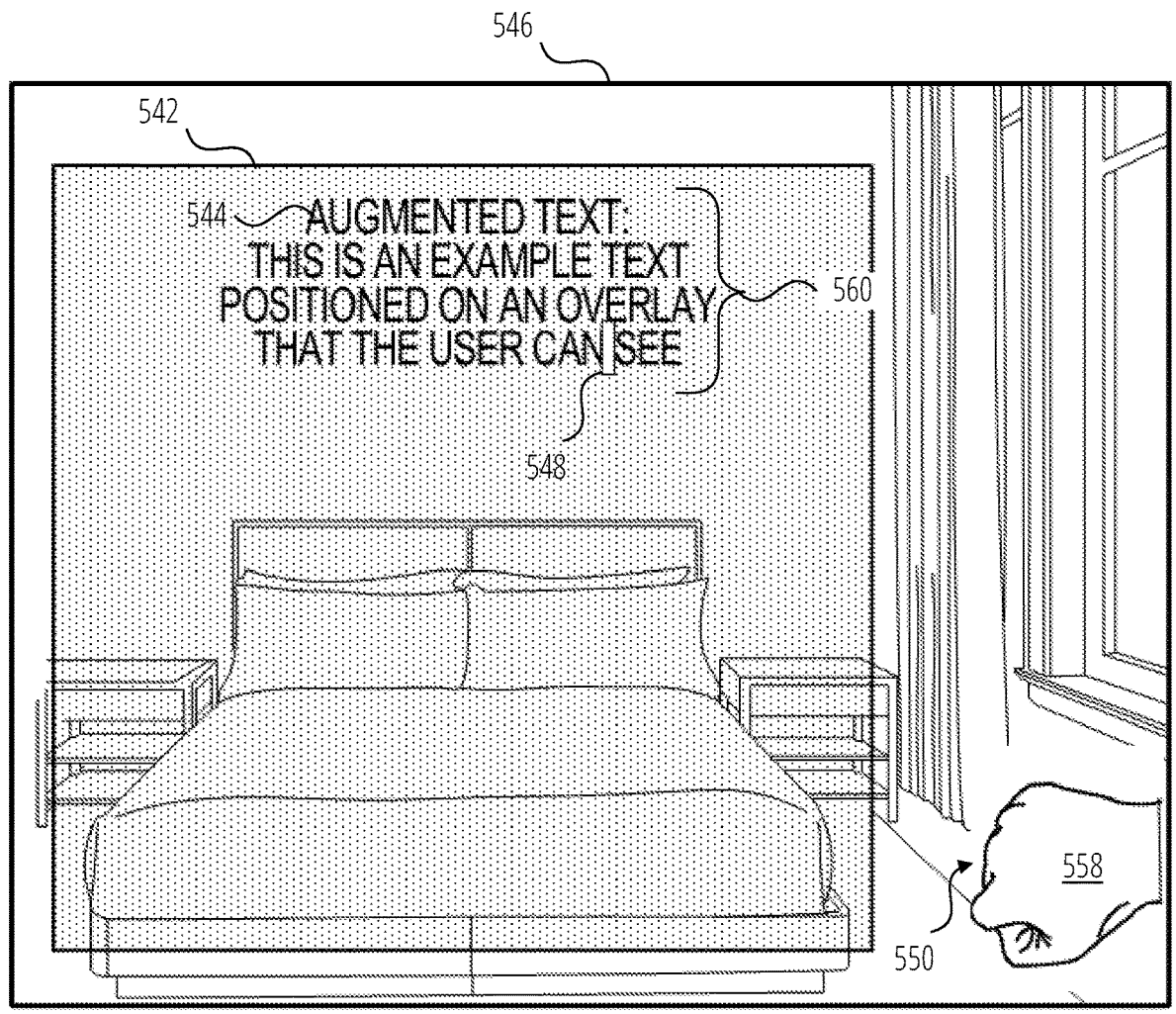
Figure 5E:
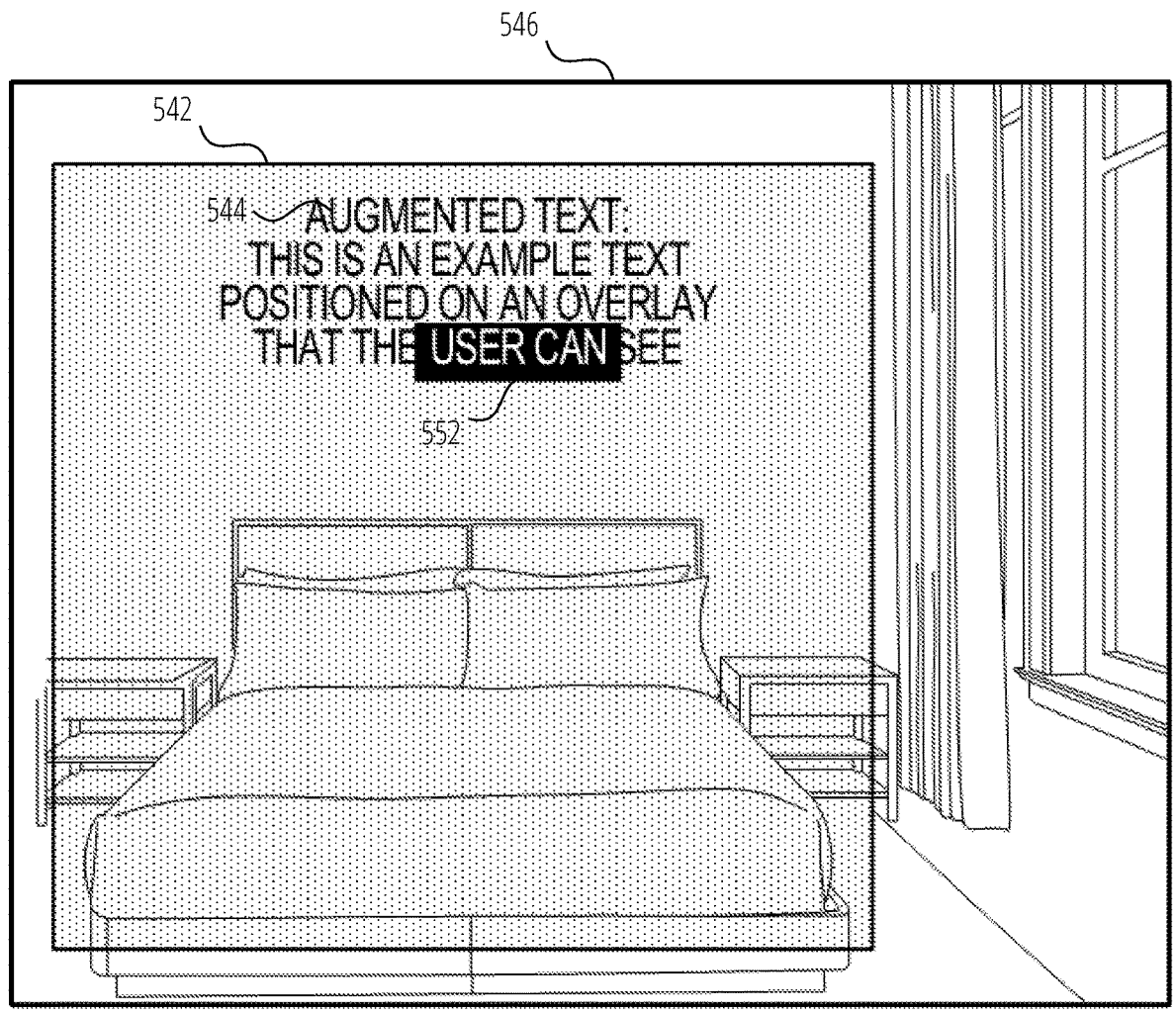

FIG. 5A is a process flow diagram of a text selection and modification process 500 of an AR system, such as, but not limited to, glasses 100; FIG. 5B is an illustration of a text selection mode gesture; and FIG. 5A, FIG. 5C, FIG. 5D, and FIG. 5E are illustrations of an AR overlay 546 including a text scene object 542 having text 544 in accordance with some examples. During the text selection and modification process 500, the AR system utilizes gesture recognition and head-tracking methodologies to implement a user interface for text selection and modification during an AR experience provided by the AR system.

In operation 502, the AR system starts the text selection and modification process 500 by invoking an AR text processing user interface application 524. The AR text processing user interface application 524 connects to a scan services component 530. The scan services component 530 includes a gesture recognition service 528 that continuously recognizes gestures made by a user while using the AR system, an object tracking service 526 that continuously tracks objects in the field of view of the AR system, and a head-tracking head tracking service 538 that continuously tracks movement of the user's head while wearing the AR system.

The object tracking service 526 scans for, detects, and tracks objects in a real-world scene including landmarks on portions of the user's upper body, arms, and hands in the real-world scene. In some examples, the object tracking service 526 receives real-world scene video frame data from one or more cameras of the AR system, such as, but not limited to, cameras 114 and 116, and extracts features of objects including the user's upper body, arms, and hands from the real-world scene video frame data. The object tracking service 526 generates current tracking data 556 based on the extracted features. The current tracking data 556 includes current object data of objects in the real-world scene, and current skeletal model data 554 including identification, location, and categorization data of landmarks associated with the user's upper body, arms, and hands. The object tracking service 526 communicates the current skeletal model data 554 to the gesture recognition service 528. In addition, the object tracking service 526 makes the current tracking data 556 available to the text selection and modification component 532.

The gesture recognition service 528 receives the current skeletal model data 554 from the object tracking service 526 and compares the current skeletal model data 554 to previously generated gesture model data. The gesture recognition service 528 detects a detected gesture on the basis of the comparison of the current skeletal model data 554 with the gesture model data and generates current detected gesture data 534 based on the detected gesture. In additional examples, the gesture recognition service 528 determines the detected gesture on the basis of categorizing the current skeletal model data 554 using artificial intelligence methodologies and a gesture model previously generated using machine learning methodologies.

The head-tracking head tracking service 538 receives head-tracking data from an IMU of the AR system, such as, but not limited to, an IMU included in position components 340 of FIG. 3, and makes current head-tracking data 536 available to the text selection and modification component 532.

During execution of the AR text processing user interface application 524, in operation 504, the AR system adds the text scene object 542 to the AR overlay 546. The text scene object 542 includes text 544 to be selected and modified by the user using the AR system. For example, the AR system generates the text scene object 542 including one or more virtual text objects 560 based on the text 544. The one or more virtual text objects 560 correspond to respective individual characters of the text 544.

In operation 506, the AR system detects a text selection mode gesture, such as, but not limited to, start/stop text selection mode gesture 540, based on current detected gesture data 534 received from the text selection and modification component 532. In operation 508, in response to detecting the text selection mode gesture, the AR system provides a text selection and modification user interface as part of text scene object 542 and enters into a text selection mode.

In operation 510, the AR system projects a text selection icon 548 onto potential text selection points in the text 544 of the text scene object 542 based on current head-tracking data generated by the head tracking service 538. For example, the AR system determines a direction the user is looking in the real-world scene based on current head-tracking data 536. The AR system generates a ray originating at an eye location of the user and projects the ray in the direction the user is looking. The AR system determines a user focus point based on a location of an intersection of the ray with the text 544 of the text scene object 542. The AR system generates the text selection icon 548 at the location of the user focus point in the text 544.

In operation 512, the AR system detects a confirmation gesture, such as a confirmation gesture 550, made by the user using a confirmation hand 558, such as the user's right hand, based on current detected gesture data 534 received by the AR system from the text selection and modification component 532.

In operation 514, in response to detecting the confirmation gesture 550, the AR system sets the text selection start point in the text 544 based on a current potential text selection point located where the AR system is currently projecting the text selection icon 548 onto the text 544. The text selection start point is a starting point in text 544 of text that will be selected from text 544.

In operation 516, the AR system determines if a text selection end point has been set. The AR system repeats operation 510 (projecting the text selection icon 548 onto potential text selection points), operation 512 (detecting a subsequent confirmation gesture made using the confirmation hand), and operation 514 (setting a text selection end point) to set the text selection end point on the basis of determining that the text selection end point has not been set.

In repeated operation 510 the AR system projects a text selection icon 548 onto potential text selection points in the text 544 of the text scene object 542 based on current head-tracking data generated by the head tracking service 538.

In repeated operation 512, the AR system detects a subsequent confirmation gesture 550 made by the user using the user's confirmation hand 558 based on current detected gesture data 534 received by the AR system from the text selection and modification component 532.

In repeated operation 514, in response to detecting the confirmation gesture 550, the AR system sets the text selection end point in the text 544 based on a subsequent current potential text selection point located where the AR system is currently projecting the text selection icon 548 onto the text 544. The text selection end point is an ending point in text 544 of text that will be selected from text 544.

In repeated operation 516, the AR system determines if the text selection end point has been selected. In operation 518, the AR system selects selected text 552 and highlights selected text 552 between the text selection start point and the text selection end point on the basis of determining that the text selection end point has been set. In operation 520, the AR system performs a text operation on the selected text 552. The text operation can be a modification of the selected text 552, cutting the selected text 552, copying the selected text 552, changing the appearance of the selected text 458, changing the formatting of the selected text, etc. In operation 522, the AR system exits the text selection mode and terminates.

FIG. 6A is a process flow diagram of a virtual keyboard process 600 of an AR system, such as, but not limited to, glasses 100, in accordance with some embodiments. FIG. 6B is a depiction of a user selection of a physical surface 640 in accordance with some embodiments. FIG. 6C is an illustration of a virtual keyboard user interface 660 in accordance with some embodiments. During the virtual keyboard process 600, the AR system utilizes gesture recognition methodologies and DMVO methodologies to implement a virtual keyboard 628 of a virtual keyboard user interface 660 on the physical surface 640 for text selection and modification during an AR experience.

The AR system executes a virtual keyboard application 620 to provide the virtual keyboard user interface 660 to the user. The virtual keyboard application 620 connects to a scan services component 626 of the AR system. The scan services component 626 includes a gesture recognition service 624 that continuously recognizes gestures made by a user while using the AR system, an object tracking service 622 that continuously tracks objects in the field of view of the AR system, and a head-tracking service 646 that continuously tracks movement of the user's head while wearing the AR system.

The object tracking service 622 receives real-world scene video frame data of a real-world scene from a perspective of a user of the AR system from one or more cameras of the AR system, such as, but not limited to, cameras 114 and 116 of FIG. 1. Included in the real-world scene video frame data are tracking video frame data of objects and portions of the user's body including portions of the user's upper body, arms, hands, and fingers in the real-world scene. The tracking video frame data includes video frame data of movement of portions of the user's upper body, arms, and hands as the user makes a gesture or moves their hands and fingers to interact with objects in an AR overlay of an AR experience; video frame data of locations of the user's arms and hands in space as the user makes the gesture or moves their hands and fingers to interact with the with objects in an AR overlay of an AR experience; video frame data of positions in which the user holds their upper body, arms, hands, and fingers as the user makes the gesture or moves their hands and fingers to interact with the with objects in an AR overlay of an AR experience; and object video frame data of objects in the real-world scene.

The object tracking service 622 scans for, detects, and tracks objects in the real-world scene including landmarks on portions of the user's upper body, arms, and hands in the real-world scene. In some examples, the object tracking service 622 receives the real-world scene video frame data from the one or more cameras and extracts features of objects including the user's upper body, arms, and hands from the tracking video frame data included in the real-world scene video frame. The object tracking service 622 generates current tracking data based on the extracted features. The current tracking data includes current object data 656 of objects in the real-world scene, and current skeletal model data 648 including identification, location, and categorization data of landmarks associated with the user's upper body, arms, and hands. The object tracking service 622 communicates the current skeletal model data 648 to the gesture recognition service 624. In addition, the object tracking service 622 makes the current tracking data available to the virtual keyboard application 620.

The gesture recognition service 624 receives the current skeletal model data 648 from the object tracking service 622 and compares the current skeletal model data 648 to previously generated gesture model data. The gesture recognition service 624 detects a detected gesture on the basis of the comparison of the current skeletal model data 648 with the gesture model data and generates current detected gesture data 650 based on the detected gesture. In additional examples, the gesture recognition service 624 determines the detected gesture on the basis of categorizing the current skeletal model data 648 using artificial intelligence methodologies and a gesture model previously generated using machine learning methodologies.

The head-tracking service 646 receives head-tracking data from an IMU of the AR system and makes current head-tracking data 652 available to the virtual keyboard application 620.

In some examples, the tracking gesture recognition service 624, gesture recognition service 624, and head-tracking service 646 operate continuously so that the current skeletal model data 648, current detected gesture data 650, and current head-tracking data 652 are available on demand for an application executing on the AR system.

During an AR experience, a user approaches a physical object 654 having a flat physical surface 640 upon which to project a virtual keyboard 628. The user focuses on a text scene object 636 of an AR overlay 658 within the AR experience and physically touches the physical surface 640 with a text entry hand 630, such as, but not limited to, their left hand. The user makes an open keyboard gesture, such as, but not limited to, open/close keyboard gesture 644, with a free hand 642, such as, but not limited to, their right hand. In operation 602, the AR system detects the open keyboard gesture based on the current detected gesture data 650 generated by the gesture recognition service 624. In response to detecting the open keyboard gesture, the AR system invokes the virtual keyboard application 620.

In some examples, the AR system determines a user's focus on a physical surface location based on current head-tracking data received from the scan services component 626. The physical surface location is determined based on a physical object that the user is focusing on without having the user touch the physical surface. The user uses a free hand to make an open keyboard gesture, such as, but not limited to, open/close keyboard gesture 644, when the user is focusing on a surface that the user wants to select. The AR system detects the open/close keyboard gesture 644 and determines a physical surface that the user is currently focusing on as the physical surface location upon which a virtual keyboard is to be virtually projected within an AR experience.

In some examples, the user makes a tapping gesture with a finger on a physical surface to indicate a physical surface upon which a virtual keyboard is to be virtually projected within an AR experience. The AR system detects the tapping motion and determines the location of the physical surface based on current skeletal model data received from the scan services component 626. When the AR system generates a virtual keyboard, the virtual keyboard is centered on the location determined from the user's finger.

In some examples, the AR system highlights a physical surface based on the user's focus on the physical surface. In some examples, the AR system highlights a physical surface based on a determination of a physical surface location determined from the user touching the physical surface.

In operation 604, the AR device detects a focus of the user on the text scene object 636 based on current head-tracking data 652 provided by the head-tracking service 646, and a location of the text scene object 636 in the AR overlay 658. In some examples, the AR device receives current head-tracking data 652 from the head-tracking service 646. The AR system determines a direction the user is looking in the real-world scene based on current head-tracking data 536. The AR system generates a ray originating at an eye location of the user and projects the ray in the direction the user is looking. The AR system detects the text scene object 636 based on an intersection of the ray with the text scene object 636.

In operation 606, the AR device determines a location in a user interface model that corresponds to a location of the physical surface 640 of a physical object 654 in the real-world scene based on current object data 656 received from the object tracking service 622. For example, the AR device determines a location of a landmark associated with a tip of an index finger of the text entry hand 630 based on current skeletal model data 648 received from the object tracking service 622. As the user is touching the physical surface 640, the location of the physical surface 640 is the location of the landmark associated with the tip of the index finger of the user's text entry hand 630. The AR device generates a geometric mesh of a virtual surface in the user interface model corresponding to the physical surface 640 based on the location of the physical surface 640 and current object data 656 received from the object tracking service 622.

In operation 608, the AR device generates the virtual keyboard user interface 660 including the virtual keyboard 628 in the AR overlay 658 and associated with the text scene object 636. The virtual keyboard 628 includes a plurality of virtual objects that constitute interactive virtual keys 632 of the virtual keyboard 628. The virtual keys 632 are virtual objects representing geometric solids having respective locations in the user interface model or volume that corresponds to a volume of space in the real-world scene that is occupied by the virtual keyboard 628. The AR device locates the virtual keyboard 628 at a location in the user interface model that corresponds to the location of the physical surface 640 in the real-world scene and orientates the virtual keyboard 628 such that a front surface of the virtual keyboard 628 corresponds to the geometric mesh of the virtual surface determined for the physical surface 640 of the physical object.

In operation 610, the AR device provides the virtual keyboard user interface 660 including the virtual keyboard 628 in a display to the user, and the virtual keyboard 628 appears to the user as if the virtual keyboard 628 is located on the physical surface 640 of the physical object 654. When the user interacts with the virtual keyboard 628, the user touches the physical surface as the user selects one or more virtual keys 632 of the virtual keyboard 628.

In operation 612, the AR device determines the user's selection of one or more selected virtual keys. For example, the AR device receives current skeletal model data 648 from the object tracking service 622. The AR device detects a landmark associated with the user's text entry hand 630, for example a tip of a forefinger, based on the current skeletal model data 648. The AR device generates a landmark collider 634 in the virtual keyboard user interface 660 based on the landmark. To select a virtual key from the virtual keys 632, the user moves their text entry hand 630 to move the landmark collider 634 within the virtual keyboard user interface 660. To move the landmark collider 634 over the virtual keys 632 without selecting a virtual key, the user retracts their text entry hand 630 away from the physical surface 640, and thus the virtual keys 632 in the user interface model thereby clearing the virtual keys 632. To select a virtual key, the user positions their text entry hand 630 over the virtual key and extends their text entry hand 630 to "press" or "poke" the virtual key until the landmark collider 634 collides with the selected virtual key and the user physically touches the physical surface 640. The AR device determines the user's selection of one or more selected virtual keys on the basis of detecting the collisions between the landmark collider 634 and the one or more selected virtual keys.

In operation 614, the AR device provides entered text to the user in the text scene object 636. For example, each of the selected virtual keys of the virtual keys 632 is associated with a character. The AR device generates entered text data based on the selected virtual keys and communicates the entered text data to the text scene object. The text scene object receives the entered text data and uses an optical engine of the AR system to provide the entered text data as entered text to the user using a display of the AR system.

In operation 616, the AR device determines if the user is making a close keyboard gesture, such as, but not limited to, open/close keyboard gesture 644. For example, the AR device receives current detected gesture data 650 from the gesture recognition service 624 and determines if a gesture being made by the user is the close keyboard gesture based on the current detected gesture data 650. In operation 618, the AR system closes the virtual keyboard user interface 660 and terminates the virtual keyboard application 620 on the basis of determining that the user is making the close keyboard gesture. The AR system continues determining the user's selection of the one or more virtual keys in operation 612 on the basis of determining that the user is not making the close keyboard gesture.

In some examples, the characters of the entered text data 638 provided to the user in the text scene object 636 are composed of virtual objects that the user interacts with using the landmark collider 634. For example, the AR device detects that the user selects a character from the text scene object 636 on the basis of detecting a collision between the landmark collider 634 and the selected character. Accordingly, the AR device can determine the user's selection or manipulation of the entered text data by detecting collisions between the landmark collider 634 and the virtual objects of the characters. Text selections can include selecting and highlighting a text area by the AR device detecting the user using their text entry hand 630 to drag the landmark collider 634 across the physical surface 640 in a location of the entered text data 638 containing characters to be selected. In some examples, the AR device provides a menu user interface to the user within the virtual keyboard user interface 660. The menu user interface contains selectable text manipulation options including copy, cut, and paste in the form of virtual objects. The AR device detects the user's selection of the text manipulation items on the basis of detecting collisions between the landmark collider 634 and the virtual objects of the selectable text manipulation options.

In some examples, the AR device of the AR system performs the functions of the gesture recognition service 624 and the head-tracking service 646 by utilizing various APIs and system libraries.

Figure 7:
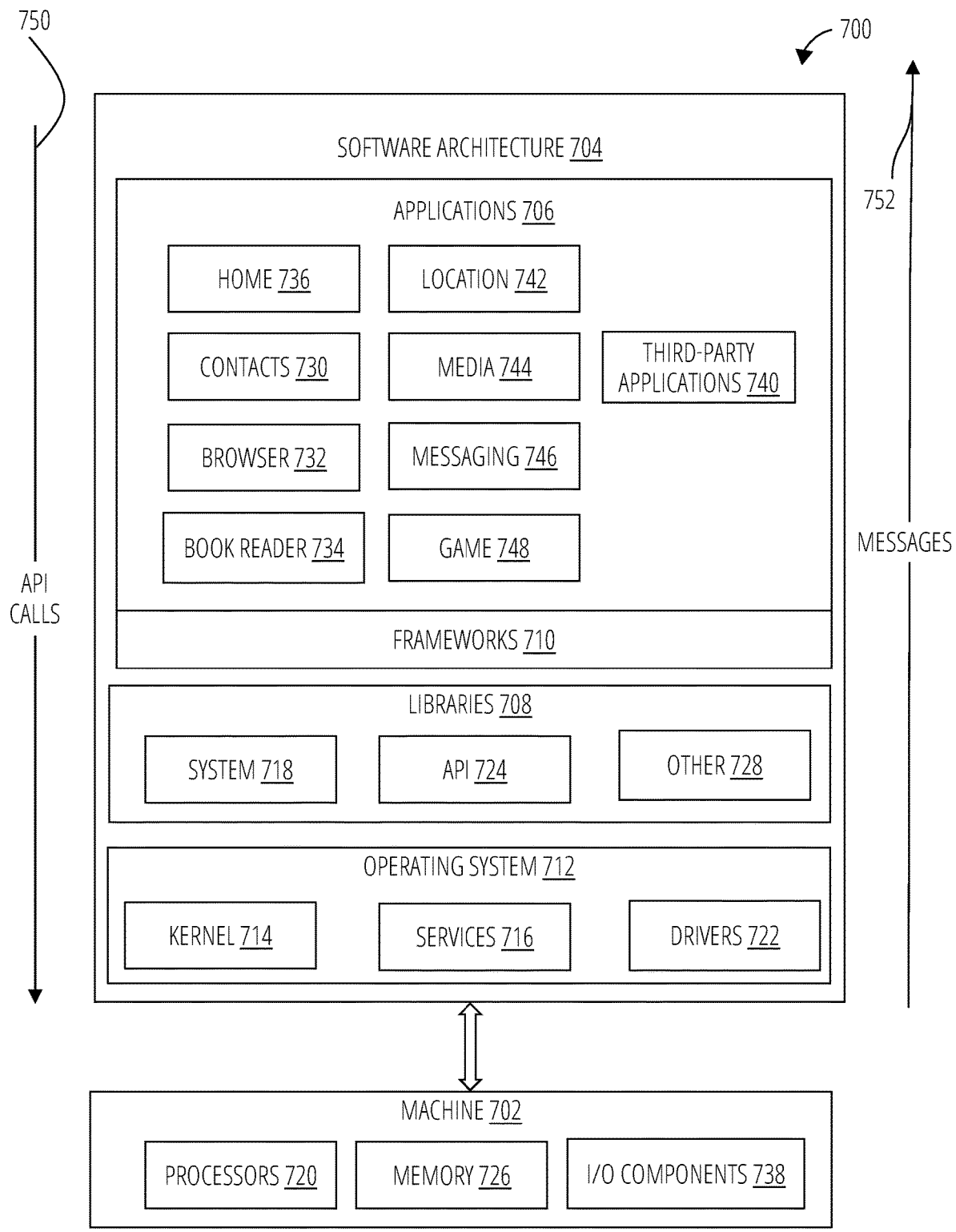
FIG. 7 is a block diagram showing a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where individual layers provide a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g., OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In some examples, the applications 706 may include a home Application 736, a contacts Application 730, a browser Application 732, a book reader Application 734, a location Application 742, a media Application 744, a messaging application 746, a game Application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
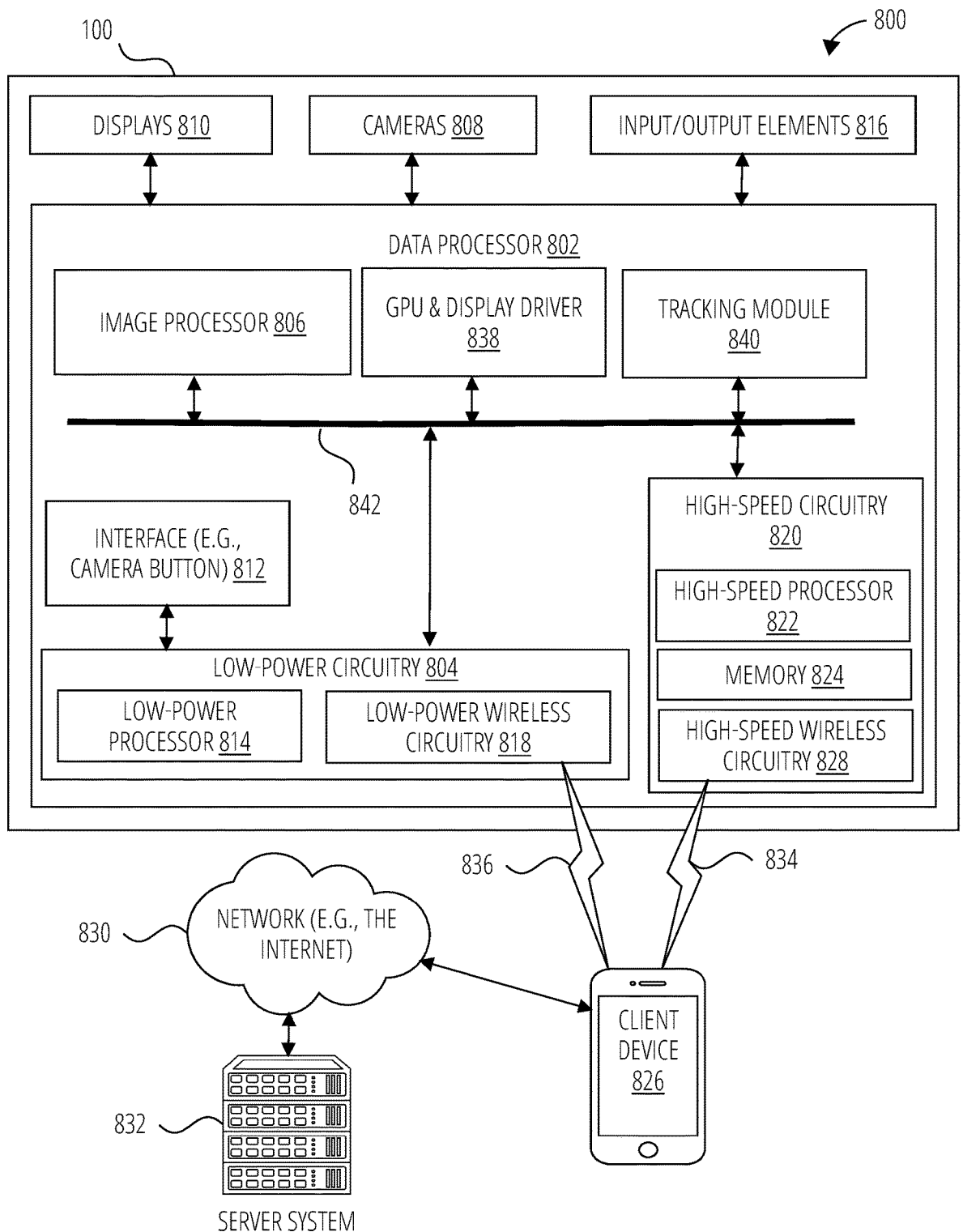
FIG. 8 is a block diagram illustrating details of the head-worn device of FIG. 1, in accordance with some examples.

FIG. 8 is a block diagram illustrating a networked system 800 including details of the glasses 100, in accordance with some examples. The networked system 800 includes the glasses 100, a client device 826, and a server system 832. The client device 826 may be a smartphone, tablet, phablet, laptop computer, access point, or any other such device capable of connecting with the glasses 100 using a low-power wireless connection 836 and/or a high-speed wireless connection 834. The client device 826 is connected to the server system 832 via the network 830. The network 830 may include any combination of wired and wireless connections. The server system 832 may be one or more computing devices as part of a service or network computing system. The client device 826 and any elements of the server system 832 and network 830 may be implemented using details of the software architecture 704 or the computing apparatus 300 described in FIG. 7 and FIG. 3 respectively.

The glasses 100 include a data processor 802, displays 810, one or more cameras 808, and additional input/output elements 816. The input/output elements 816 may include microphones, audio speakers, biometric sensors, additional sensors, or additional display elements integrated with the data processor 802. Examples of the input/output elements 816 are discussed further with respect to FIG. 7 and FIG. 3. For example, the input/output elements 816 may include any of I/O components 306 including output components 328, motion components 336, and so forth. Examples of the displays 810 are discussed in FIG. 2. In the particular examples described herein, the displays 810 include a display for the user's left and right eyes.

The data processor 802 includes an image processor 806 (e.g., a video processor), a GPU & display driver 838, a tracking module 840, an interface 812, low-power circuitry 804, and high-speed circuitry 820. The components of the data processor 802 are interconnected by a bus 842.

The interface 812 refers to any source of a user command that is provided to the data processor 802. In one or more examples, the interface 812 is a physical button that, when depressed, sends a user input signal from the interface 812 to a low-power processor 814. A depression of such button followed by an immediate release may be processed by the low-power processor 814 as a request to capture a single image, or vice versa. A depression of such a button for a first period of time may be processed by the low-power processor 814 as a request to capture video data while the button is depressed, and to cease video capture when the button is released, with the video captured while the button was depressed stored as a single video file. Alternatively, depression of a button for an extended period of time may capture a still image. In some examples, the interface 812 may be any mechanical switch or physical interface capable of accepting user inputs associated with a request for data from the cameras 808. In other examples, the interface 812 may have a software component, or may be associated with a command received wirelessly from another source, such as from the client device 826.

The image processor 806 includes circuitry to receive signals from the cameras 808 and process those signals from the cameras 808 into a format suitable for storage in the memory 824 or for transmission to the client device 826. In one or more examples, the image processor 806 (e.g., video processor) comprises a microprocessor integrated circuit (IC) customized for processing sensor data from the cameras 808, along with volatile memory used by the microprocessor in operation.

The low-power circuitry 804 includes the low-power processor 814 and the low-power wireless circuitry 818. These elements of the low-power circuitry 804 may be implemented as separate elements or may be implemented on a single IC as part of a system on a single chip. The low-power processor 814 includes logic for managing the other elements of the glasses 100. As described above, for example, the low-power processor 814 may accept user input signals from the interface 812. The low-power processor 814 may also be configured to receive input signals or instruction communications from the client device 826 via the low-power wireless connection 836. The low-power wireless circuitry 818 includes circuit elements for implementing a low-power wireless communication system. Bluetooth™ Smart, also known as Bluetooth™ low energy, is one standard implementation of a low power wireless communication system that may be used to implement the low-power wireless circuitry 818. In other examples, other low power communication systems may be used.

The high-speed circuitry 820 includes a high-speed processor 822, a memory 824, and a high-speed wireless circuitry 828. The high-speed processor 822 may be any processor capable of managing high-speed communications and operation of any general computing system used for the data processor 802. The high-speed processor 822 includes processing resources used for managing high-speed data transfers on the high-speed wireless connection 834 using the high-speed wireless circuitry 828. In some examples, the high-speed processor 822 executes an operating system such as a LINUX operating system or other such operating system such as the operating system 712 of FIG. 7. In addition to any other responsibilities, the high-speed processor 822 executing a software architecture for the data processor 802 is used to manage data transfers with the high-speed wireless circuitry 828. In some examples, the high-speed wireless circuitry 828 is configured to implement Institute of Electrical and Electronic Engineers (IEEE) 802.11 communication standards, also referred to herein as Wi-Fi. In other examples, other high-speed communications standards may be implemented by the high-speed wireless circuitry 828.

The memory 824 includes any storage device capable of storing camera data generated by the cameras 808 and the image processor 806. While the memory 824 is shown as integrated with the high-speed circuitry 820, in other examples, the memory 824 may be an independent stand-alone element of the data processor 802. In some such examples, electrical routing lines may provide a connection through a chip that includes the high-speed processor 822 from image processor 806 or the low-power processor 814 to the memory 824. In other examples, the high-speed processor 822 may manage addressing of the memory 824 such that the low-power processor 814 will boot the high-speed processor 822 any time that a read or write operation involving the memory 824 is desired.

The tracking module 840 estimates a pose of the glasses 100. For example, the tracking module 840 uses image data and associated inertial data from the cameras 808 and the position components 340, as well as GPS data, to track a location and determine a pose of the glasses 100 relative to a frame of reference (e.g., real-world scene environment). The tracking module 840 continually gathers and uses updated sensor data describing movements of the glasses 100 to determine updated three-dimensional poses of the glasses 100 that indicate changes in the relative position and orientation relative to physical objects in the real-world scene environment. The tracking module 840 permits visual placement of virtual objects relative to physical objects by the glasses 100 within the field of view of the user via the displays 810.

The GPU & display driver 838 may use the pose of the glasses 100 to generate frames of virtual content or other content to be presented on the displays 810 when the glasses 100 are functioning in a traditional augmented reality mode. In this mode, the GPU & display driver 838 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 826, or on a remote server. For example, one or more functions or operations described herein may be performed by one of the applications 706 such as messaging application 746.

Figure 9:
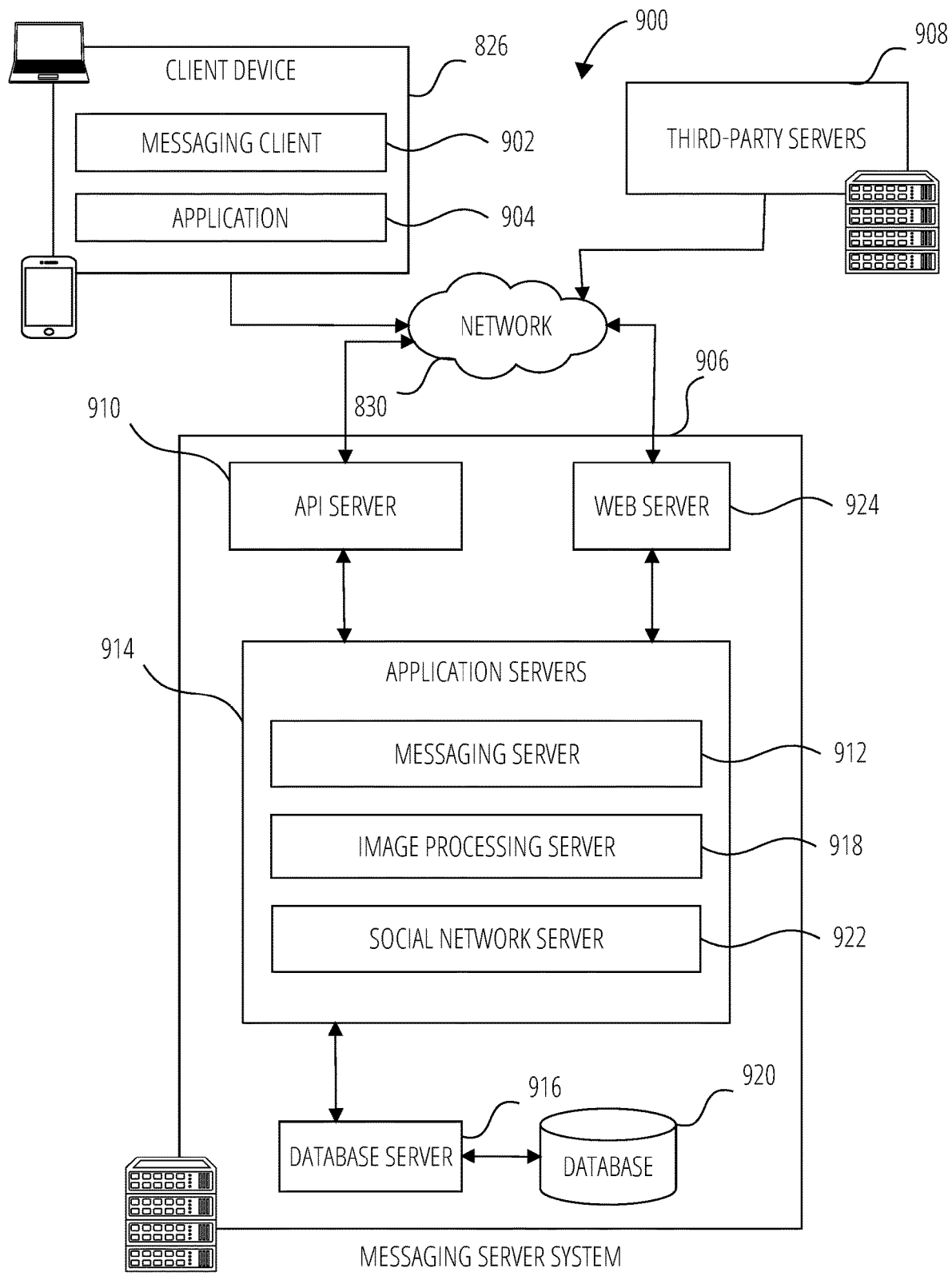
FIG. 9 is a diagrammatic representation of a networked environment in which the present disclosure may be deployed, in accordance with some examples.

FIG. 9 is a block diagram showing an example messaging system 900 for exchanging data (e.g., messages and associated content) over a network. The messaging system 900 includes multiple instances of a client device 826 which host a number of applications, including a messaging client 902 and other Applications 904. A messaging client 902 is communicatively coupled to other instances of the messaging client 902 (e.g., hosted on respective other client devices 826), a messaging server system 906 and third-party servers 908 via a network 830 (e.g., the Internet). A messaging client 902 can also communicate with locally-hosted Applications 904 using Application Program Interfaces (APIs).

A messaging client 902 is able to communicate and exchange data with other messaging clients 902 and with the messaging server system 906 via the network 830. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 830 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a client device 826 has sufficient processing capacity.

The messaging server system 906 supports various services and operations that are provided to the messaging client 902. Such operations include transmitting data to, receiving data from, and processing data generated by the messaging client 902. This data may include message content, client device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914 and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the client device 826 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a client device 826, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the client device 826, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
generating, by one or more processors of an Augmented Reality (AR) system, a text scene object including one or more virtual text objects based on a text;
detecting, by the one or more processors, using one or more cameras of the AR system, a text selection gesture made by a user of the AR system, the text selection gesture made by a selection hand of the user;
detecting, by the one or more processors, using the one or more cameras, a landmark on the selection hand of the user;
generating, in response to the text selection gesture, by the one or more processors, a selection line based on the landmark, the selection line projected from the landmark toward a surface of the one or more virtual text objects of the text scene object, the selection line a line collider moved by the user to select text;
providing, by the one or more processors, the selection line as a virtual stylus to the user;
detecting, by the one or more processors, using the one or more cameras, a confirmation gesture made by the user, the confirmation gesture confirming a text selection start point, the confirmation gesture made by a confirmation hand of the user separate from the selection hand of the user;
setting, in response to detecting the confirmation gesture, by the one or more processors, the text selection start point at an intersection of the virtual stylus with a start virtual text object of the one or more virtual text objects;
tracking, by the one or more processors, using the one or more cameras, the selection hand making the text selection gesture as the user moves the selection hand to position the virtual stylus at a position of a text selection end point in the virtual text objects;
detecting, by the one or more processors, using the one or more cameras, a subsequent confirmation gesture made by the user using the confirmation hand separate from the selection hand, the subsequent confirmation gesture confirming a text selection end point;
setting, in response to detecting the subsequent confirmation gesture, by the one or more processors, the text selection end point at an intersection of the virtual stylus with an end virtual text object of the one or more virtual text objects; and
selecting, by the one or more processors, selected text from the text based on the text selection start point and the text selection end point.

2. The computer-implemented method of claim 1, further comprising:
detecting, by the one or more processors, using the one or more cameras, a text selection mode gesture made by the user; and
providing, in response to detecting the text selection mode gesture, by the one or more processors, a text selection and modification user interface as part of the text scene object.

3. The computer-implemented method of claim 1, wherein the confirmation gesture and the subsequent confirmation gesture are a same gesture.

4. The computer-implemented method of claim 1, wherein the landmark of the selection hand is a middle point of two of the user's fingers of the user used to that perform the text selection gesture.

5. The computer-implemented method of claim 1, wherein the AR system comprises a head-worn device.

6. A computing apparatus comprising:
one or more processors; and
a memory storing instructions that, when executed by the one or more processors, cause the computing apparatus to perform operations comprising:
generating a text scene object including one or more virtual text objects based on a text;
detecting, using one or more cameras of an AR system, a text selection gesture made by a user of the AR system using a selection hand of the user;
detecting, using the one or more cameras, a landmark on the selection hand of the user;
generating, in response to the text selection gesture, a selection line based on the landmark, the selection line projected from the landmark toward a surface of the one or more virtual text objects of the text scene object, the selection line a line collider moved by the user to select text;
providing the selection line as a virtual stylus to the user;
detecting, using the one or more cameras, a confirmation gesture made by the user, the confirmation gesture confirming a text selection start point, the confirmation gesture made by a confirmation hand of the user separate from the selection hand of the user;
setting, in response to detecting the confirmation gesture, the text selection start point at an intersection of the virtual stylus with a start virtual text object of the one or more virtual text objects;
tracking, using the one or more cameras, the selection hand of the user making the text selection gesture as the user moves the selection hand to position the virtual stylus at a position of a text selection end point in the virtual text objects;
detecting, using the one or more cameras, a subsequent confirmation gesture made by the user using the confirmation hand separate from the selection hand, the subsequent confirmation gesture confirming a text selection end point;
setting, in response to detecting the subsequent confirmation gesture, the text selection end point at an intersection of the virtual stylus with an end virtual text object of the one or more virtual text objects; and
selecting selected text from the text based on the text selection start point and the text selection end point.

7. The computing apparatus of claim 6, wherein the instructions further cause the computing apparatus to perform operations of:
detecting, using the one or more cameras, a text selection mode gesture made by the user; and providing, in response to detecting the text selection mode gesture, a text selection and modification user interface as part of the text scene object.

8. The computing apparatus of claim 6, wherein the confirmation gesture and the subsequent confirmation gesture are a same gesture.

9. The computing apparatus of claim 6, wherein the landmark of the selection hand is a middle point of two of the user's fingers of the user used to that perform the text selection gesture.

10. The computing apparatus of claim 6, wherein the AR system comprises a head-worn device.

11. A non-transitory computer-readable storage medium, the computer-readable storage medium including instructions that when executed by a computer, cause the computer to perform operations comprising:
generating a text scene object including one or more virtual text objects based on a text;
detecting using one or more cameras of an AR system, a text selection gesture made by a user of the AR system using a selection hand of the user;
detecting, using the one or more cameras, a landmark on the selection hand of the user;
generating a selection line based on the landmark, the selection line projected from the landmark toward a surface of the one or more virtual text objects of the text scene object, the selection line a line collider moved by the user to select text;
providing the selection line as a virtual stylus to the user;
detecting using the one or more cameras, a confirmation gesture made by the user, the confirmation gesture made by a confirmation hand of the user separate from the selection hand of the user, the confirmation gesture confirming a text selection start point;
setting, in response to detecting the confirmation gesture, the text selection start point at an intersection of the virtual stylus with a start virtual text object of the one or more virtual text objects;
tracking, using the one or more cameras, the selection hand making the text selection gesture as the user moves the selection hand to position the virtual stylus at a position of a text selection end point in the virtual text objects;
detecting, using the one or more cameras, a subsequent confirmation gesture made by the user using the confirmation hand separate from the selection hand, the subsequent confirmation gesture confirming a text selection end point;
setting, in response to detecting the subsequent confirmation gesture, the text selection end point at an intersection of the virtual stylus with an end virtual text object of the one or more virtual text objects; and
selecting selected text from the text based on the text selection start point and the text selection end point.

12. The non-transitory computer-readable storage medium of claim 11, wherein the instructions further cause the computer to perform operations of:
detecting, using the one or more cameras, a text selection mode gesture made by the user; and
providing, in response to detecting the text selection mode gesture a text selection and modification user interface as part of the text scene object.

13. The non-transitory computer-readable storage medium of claim 11, wherein the confirmation gesture and the subsequent confirmation gesture are a same gesture.

14. The non-transitory computer-readable storage medium of claim 11, wherein the landmark of the selection hand is a middle point of two of the user's fingers of the user used to that perform the text selection gesture.

15. The non-transitory computer-readable storage medium of claim 11, wherein the AR system comprises a head-worn device.

* * * * *